(12) United States Patent
Niwa

(10) Patent No.: US 11,375,149 B2
(45) Date of Patent: Jun. 28, 2022

(54) SOLID-STATE IMAGE SENSOR AND IMAGING DEVICE

(71) Applicant: Sony Semiconductor Solutions Corporation, Kanagawa (JP)

(72) Inventor: Atsumi Niwa, Kanagawa (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 0 days.

(21) Appl. No.: 17/057,379

(22) PCT Filed: Oct. 15, 2019

(86) PCT No.: PCT/JP2019/040379
§ 371 (c)(1),
(2) Date: Nov. 20, 2020

(87) PCT Pub. No.: WO2020/105313
PCT Pub. Date: May 28, 2020

(65) Prior Publication Data
US 2021/0195130 A1 Jun. 24, 2021

(30) Foreign Application Priority Data
Nov. 19, 2018 (JP) .............................. JP2018-216590

(51) Int. Cl.
*H04N 5/378* (2011.01)
(52) U.S. Cl.
CPC .................................. *H04N 5/378* (2013.01)

(58) Field of Classification Search
CPC .... H04N 5/378; H04N 5/3745; H04N 5/3454; H04N 5/3355; H04N 5/37455; H03M 1/00–645
USPC .................................. 348/302; 341/155–172
See application file for complete search history.

(56) References Cited

U.S. PATENT DOCUMENTS

| | | | |
|---|---|---|---|
| 2005/0195304 A1* | 9/2005 | Nitta | H04N 5/378 348/E3.02 |
| 2016/0094796 A1* | 3/2016 | Govil | H04N 5/37452 348/295 |
| 2019/0165022 A1* | 5/2019 | Wada | H01L 27/14636 |

FOREIGN PATENT DOCUMENTS

JP 2017-535999 A 11/2017

\* cited by examiner

*Primary Examiner* — Lin Ye
*Assistant Examiner* — Chan T Nguyen
(74) *Attorney, Agent, or Firm* — Michael Best & Friedrich LLP

(57) ABSTRACT

In a solid-state image sensor that detects presence or absence of an address event, power consumption when capturing an image is reduced.
The solid-state image sensor includes a plurality of pixels and an analog-digital conversion unit. In the solid-state image sensor, each of the plurality of pixels generates an analog signal by photoelectric conversion. Moreover, in the solid-state image sensor, the analog-digital conversion unit converts the analog signal of a pixel into a digital signal, the pixel having an amount of change in incident light amount that falls outside a predetermined range, of the plurality of pixels.

18 Claims, 24 Drawing Sheets

FIG. 13
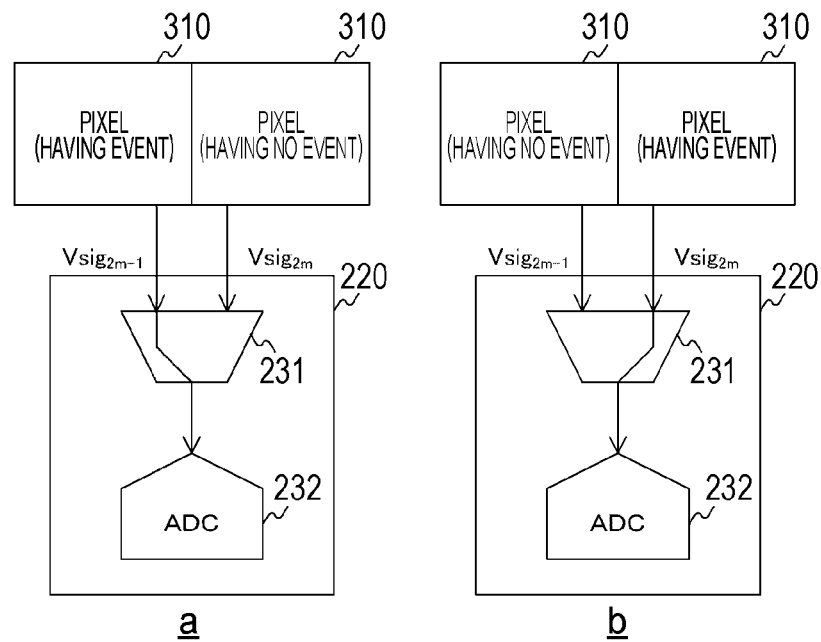
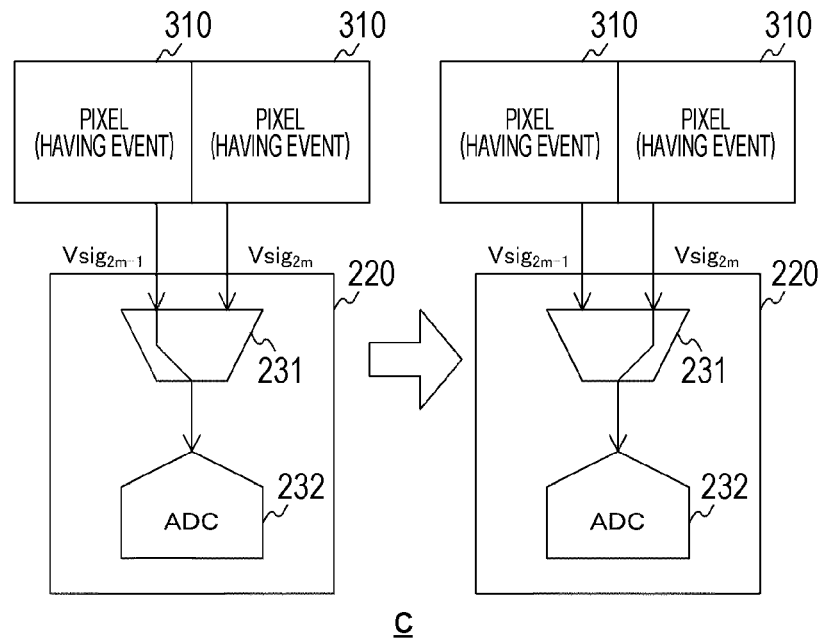

SOLID-STATE IMAGE SENSOR AND IMAGING DEVICE

TECHNICAL FIELD

The present technology relates to a solid-state image sensor and an imaging device. More specifically, the present technology relates to a solid-state image sensor that compares a light amount of incident light with a threshold, and an imaging device.

BACKGROUND ART

Conventionally, a synchronous solid-state image sensor for capturing image data (frame) in synchronization with a synchronous signal such as a vertical synchronous signal has been used in an imaging device or the like. The typical synchronous solid-state image sensor can acquire the image data only at each cycle (for example, ⅙₀ seconds) of the synchronous signal, and is thus difficult to deal with a case where higher-speed processing is required in the fields of transportation, robots, and the like. Therefore, an asynchronous solid-state image sensor that detects the presence or absence of an address event for each pixel has been proposed (for example, see Patent Document 1). Here, the address event means that a light amount of a pixel varies at a certain pixel address and a variation amount has exceeded a threshold. The address event includes an on-event in which the light amount of a pixel has varied and the variation amount has exceeded a predetermined upper limit, and an off-event in which the variation amount has fallen below a predetermined lower limit. In the asynchronous solid-state image sensor, two-bit data including a detection result of a one-bit on-event and a detection result of a one-bit off-event is generated for each pixel. Such a solid-state image sensor for detecting the presence or absence of an address event for each pixel is called dynamic vision sensor (DVS).

CITATION LIST

Patent Document

Patent Document 1: PCT Japanese Translation Patent Publication No. 2017-535999

SUMMARY OF THE INVENTION

Problems to be Solved by the Invention

The above-described asynchronous solid-state image sensor (DVS) generates data at a much higher speed than the synchronous solid-state image sensor. However, in image recognition or the like, high-quality image data of three bits or more is sometimes required for each pixel, in addition to detection of the presence or absence of an address event, and the above-described DVS for generating two-bit data for each pixel cannot satisfy the request. To capture a higher-quality image while detecting the presence or absence of an address event, it is only required to add a circuit similar to a synchronous solid-state image sensor to the DVS. However, the power consumption increases by the added circuit, which is thus not favorable.

The present technology has been made in view of such a situation, and an object is to further capture an image in a solid-state image sensor that detects the presence or absence of an address event.

Solutions to Problems

The present technology has been made to solve the above-described problem, and the first aspect thereof is a solid-state image sensor including a plurality of pixels each configured to generate an analog signal by photoelectric conversion, and an analog-digital conversion unit configured to convert the analog signal of a pixel into a digital signal, the pixel having an amount of change in incident light amount that falls outside a predetermined range, of the plurality of pixels. This brings about an effect that the analog signal of the pixel in which an address event has occurred is converted into the digital signal.

Furthermore, in the first aspect, the analog-digital conversion unit may include a selection unit that selects the analog signal of the pixel having the amount of change that falls outside the predetermined range from among the analog signals of the plurality of pixels, and an analog-digital converter that converts the selected analog signal into the digital signal. This brings about an effect that the analog signal selected by the selection unit is converted into the digital signal.

Furthermore, in the first aspect, the plurality of pixel may be provided in a predetermined number of columns arrayed in a predetermined direction, the analog-digital conversion unit may include a fixed number of analog-digital converters for each of the columns, and in a case where the amount of change of a pixel belonging to the corresponding column, of the plurality of pixels, falls outside the predetermined range, the analog-digital converter converts the analog signal of the pixel into the digital signal. This brings about an effect that the analog signal is converted into the digital signal by the analog-digital converters arranged for each column.

Furthermore, in the first aspect, the plurality of pixels may be provided in a predetermined number of columns arrayed in a predetermined direction, and the analog-digital conversion unit may include a first analog-digital conversion unit connected to part of the predetermined number of columns, and a second analog-digital conversion unit connected to rest of the predetermined number of columns. This brings about an effect that the analog signal is converted into the digital signal by the first and second analog-digital conversion units.

Furthermore, in the first aspect, each of the first and second analog-digital conversion units may include a selection unit that selects the analog signal of a column having the amount of change that falls outside the predetermined range from among the analog signals of the corresponding columns, and an analog-digital converter that converts the selected analog signal into the digital signal. This brings about an effect that the selected analog signal is converted into the digital signal by each of the first and second analog-digital conversion units.

Furthermore, in the first aspect, each of the first and second analog-digital conversion units may include a fixed number of analog-digital converters for the each corresponding columns, and in a case where the amount of change of a pixel belonging to the corresponding column, of the plurality of pixels, falls outside the predetermined range, the analog-digital converter may convert the analog signal of the pixel into the digital signal. This brings about an effect that the analog signal is converted into the digital signal by the analog-digital converters arranged for each column in each of the first and second analog-digital conversion units.

Furthermore, in the first aspect, each of the plurality of pixels may include a pixel signal generation unit that generates the analog signal, and a detection unit that detects whether or not an absolute value of the amount of change exceeds a predetermined threshold, and generates a predetermined enable signal on the basis of a detection result, and the analog-digital conversion unit may convert the analog signal into the digital signal according to the enable signal. This brings about an effect that the analog signal is converted into the digital signal according to the enable signal from a pixel.

Furthermore, in the first aspect, a row arbiter configured to arbitrate first requests from a predetermined number of respective rows arrayed in a direction perpendicular to a predetermined direction may be further included, the plurality of pixels may be arrayed in the predetermined number of rows, and each of the plurality of pixels may transmit the first request in a case where the amount of change falls outside the predetermined range. This brings an effect that the requests from the respective rows are arbitrated.

Furthermore, in the first aspect, a column arbiter configured to arbitrate second requests from a predetermined number of respective columns arrayed in the predetermined direction may be further included, and each of the plurality of pixels may transmit the second request on the basis of an arbitration result of the row arbiter. This brings an effect that the requests from the respective columns are arbitrated.

Furthermore, in the first aspect, the column arbiter may generate a predetermined enable signal on the basis of the second request, and the analog-digital conversion unit may convert the analog signal into the digital signal according to the enable signal. This brings about an effect that the analog signal is converted into the digital signal according to the enable signal from the column arbiter.

Furthermore, the second aspect of the present technology is an imaging device including a plurality of pixels each configured to generate an analog signal by photoelectric conversion, an analog-digital conversion unit configured to convert the analog signal of a pixel into a digital signal, the pixel having an absolute value of an incident light amount that falls outside a predetermined range, of the plurality of pixels, and a signal processing unit configured to process the digital signal. This brings about an effect that the analog signal of the pixel in which an address event has occurred is converted into the digital signal, and the digital signal is processed.

BRIEF DESCRIPTION OF DRAWINGS

FIG. 13 is diagrams for describing readout control according to the first embodiment of the present technology.

MODE FOR CARRYING OUT THE INVENTION

Hereinafter, modes for implementing the present technology (hereinafter referred to as embodiments) will be described. Description will be given according to the following order.

1. First Embodiment (an example of reading a pixel signal of a pixel in which an address event has occurred)

2. Second Embodiment (an example of reading pixel signals in two rows in parallel in which an address event has occurred)

3. Third Embodiment (an example in which upper-side and lower-side column ADCs read a pixel signal of a pixel in which an address event has occurred in parallel)

4. Fourth Embodiment (an example of arranging an ADC for each two columns of upper-side and lower-side column ADCs and reading a pixel signal of a pixel in which an address event has occurred)

5. Fifth Embodiment (an example of arranging an X arbiter and reading a pixel signal of a pixel in which an address event has occurred)

6. Sixth Embodiment (scan method)

7. Application Examples to Moving Bodies

1. First Embodiment

[Configuration Example of Imaging Device]

Figure 1:
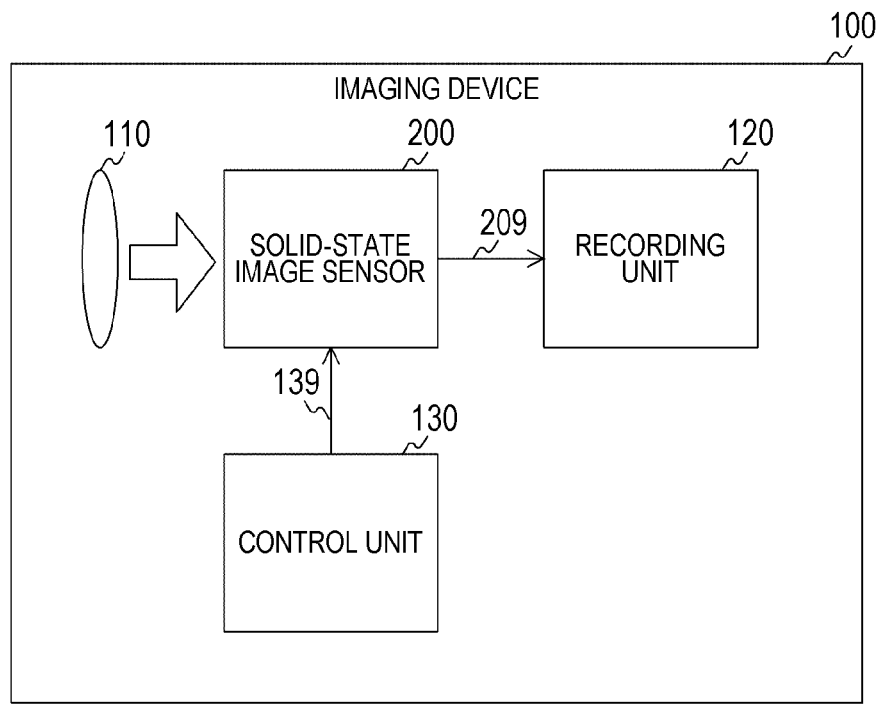
FIG. 1 is a block diagram illustrating a configuration example of an imaging device according to a first embodiment of the present technology.

FIG. 1 is a block diagram illustrating a configuration example of an imaging device 100 according to a first embodiment of the present technology. The imaging device 100 includes an imaging lens 110, a solid-state image sensor 200, a recording unit 120, and a control unit 130. As the imaging device 100, a camera mounted on an industrial robot, a vehicle-mounted camera, or the like is assumed.

The imaging lens 110 condenses incident light and guides the incident light to the solid-state image sensor 200. The solid-state image sensor 200 photoelectrically converts the incident light while detecting presence or absence of an address event to capture image data. The solid-state image sensor 200 executes predetermined signal processing such as image recognition processing for the captured image data, and outputs data indicating a processing result to the recording unit 120 via a signal line 209.

The recording unit 120 records the data from the solid-state image sensor 200. The control unit 130 causes the solid-state image sensor 200 to capture image data.

[Configuration Example of Solid-State Image Sensor]

Figure 2:
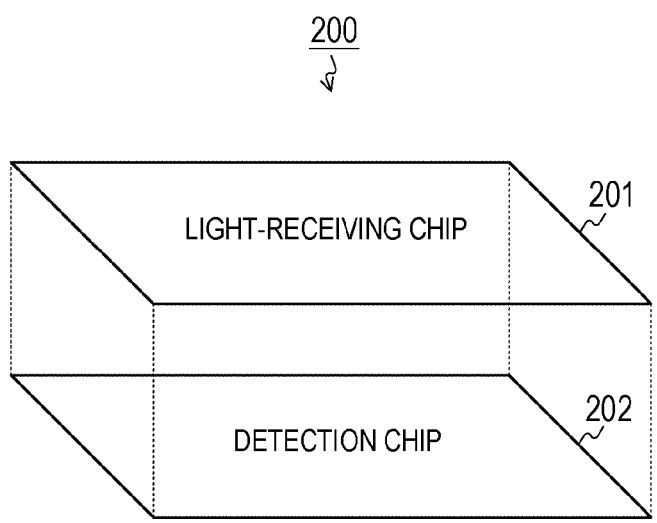
FIG. 2 is a diagram illustrating an example of a stacked structure of a solid-state image sensor according to the first embodiment of the present technology.

FIG. 2 is a diagram illustrating an example of a stacked structure of the solid-state image sensor 200 according to the first embodiment of the present technology. The solid-state image sensor 200 includes a detection chip 202 and a light-receiving chip 201 stacked on the detection chip 202. These chips are electrically connected via a connection part such as a via. Note that Cu—Cu bonding or bump can be used for connection in addition to the via.

Figure 3:
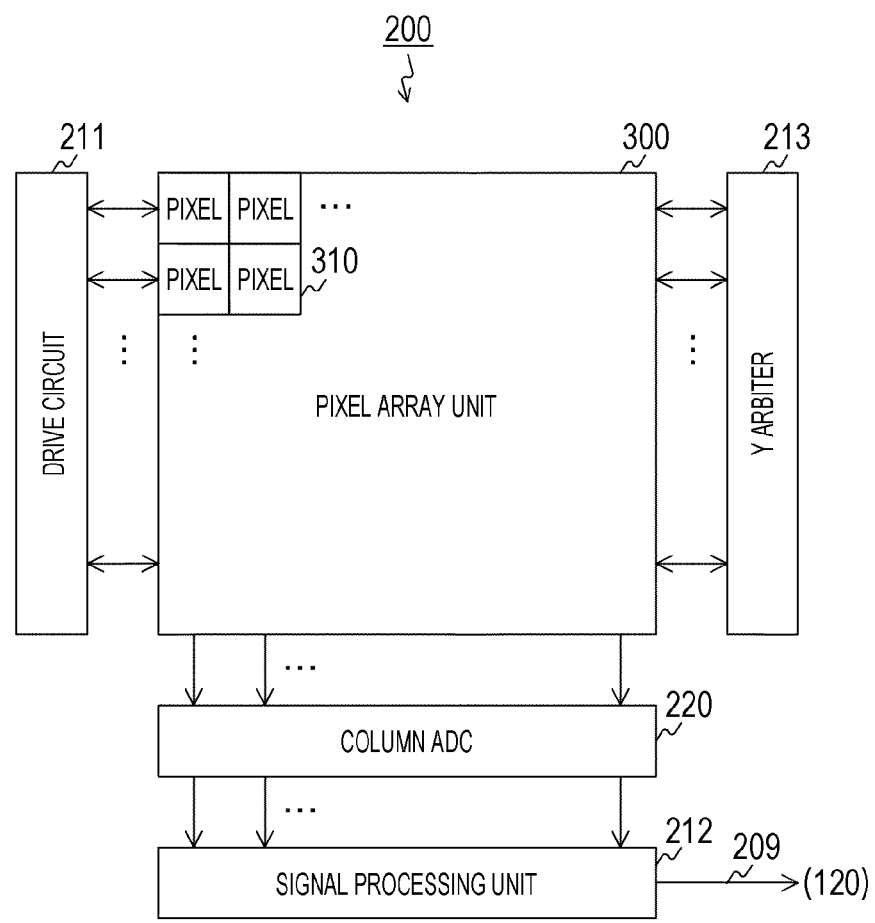
FIG. 3 is a block diagram illustrating a configuration example of the solid-state image sensor according to the first embodiment of the present technology.

FIG. 3 is a block diagram illustrating a configuration example of the solid-state image sensor 200 according to the first embodiment of the present technology. The solid-state image sensor 200 includes a drive circuit 211, a signal processing unit 212, a Y arbiter 213, a column ADC 220, and a pixel array unit 300.

In the pixel array unit 300, a plurality of pixels 310 is arrayed in a two-dimensional lattice manner. Hereinafter, a set of the pixels arrayed in a horizontal direction is referred to as a "row", and a set of the pixels arrayed in a direction perpendicular to the row is referred to as a "column".

The pixel 310 generates an analog signal as a pixel signal by photoelectric conversion. Furthermore, the pixel 310 detects the presence or absence of an address event according to whether or not the amount of change in an incident light amount has exceeded a predetermined threshold. Then, when an address event has occurred, the pixel 310 outputs a request to the Y arbiter 213. Then, when receiving a response to the request, the pixel 310 transmits a detection signal indicating a detection result of the address event to the drive circuit 211 and the column ADC 220.

The drive circuit 211 drives each pixel 310 to output the pixel signal to the column ADC 220.

The Y arbiter 213 arbitrates requests from a plurality of rows and returns a response on the basis of an arbitration result. Note that the Y arbiter 213 is an example of a row arbiter described in the claims.

The column ADC 220 converts, for each column, the analog pixel signal from the column into a digital signal. The column ADC 220 supplies the digital signal to the signal processing unit 212.

The signal processing unit 212 executes predetermined signal processing such as correlated double sampling (CDS) processing and image recognition processing for the digital signal from the column ADC 220 and the detection signal from the pixel 310. The signal processing unit 212 supplies data indicating a processing result to the recording unit 120 via the signal line 209.

[Configuration Example of Pixel]

Figure 4:
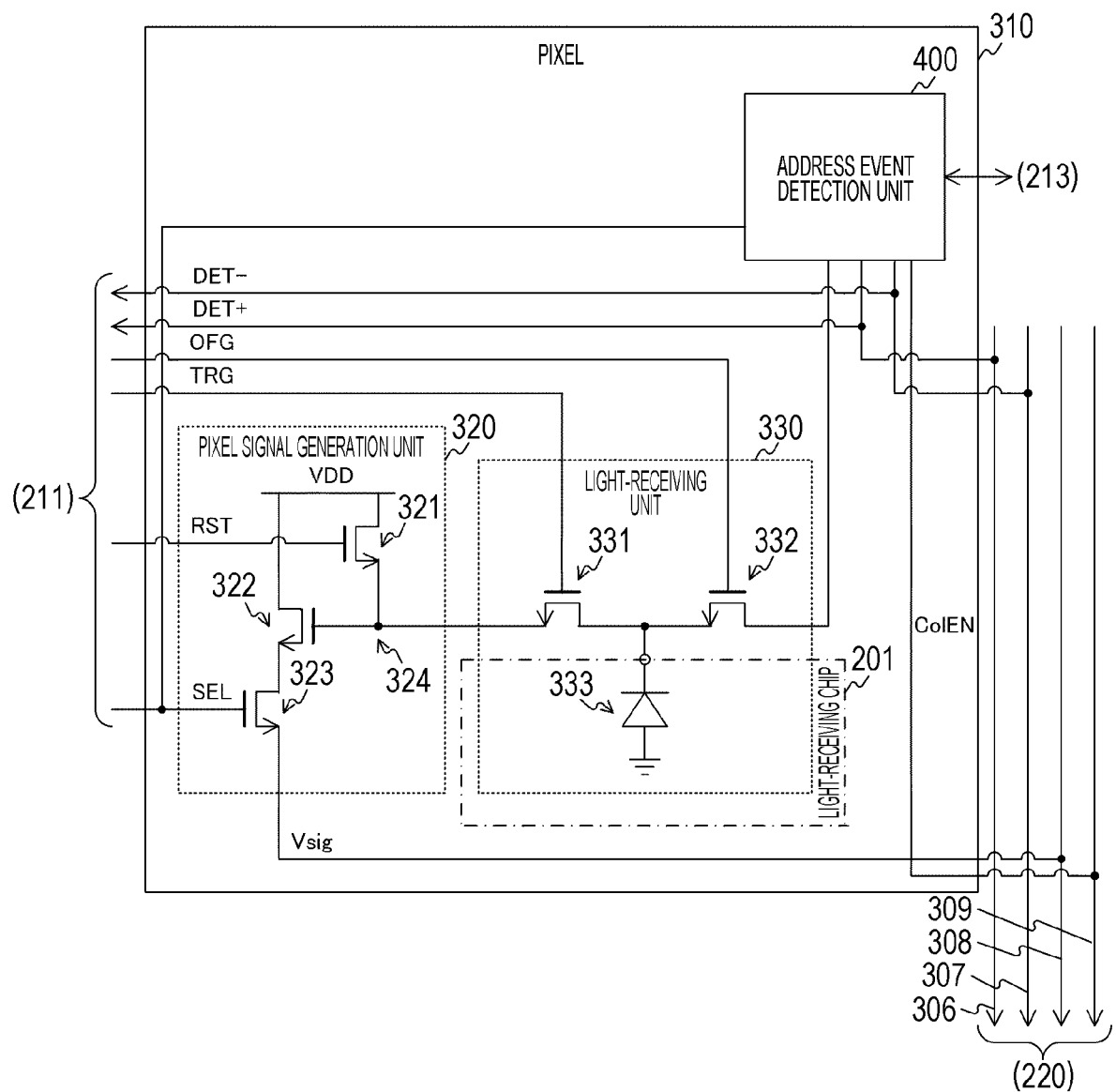
FIG. 4 is a block diagram illustrating a configuration example of a pixel according to the first embodiment of the present technology.

FIG. 4 is a block diagram illustrating a configuration example of the pixel 310 according to the first embodiment of the present technology. The pixel 310 includes a pixel signal generation unit 320, a light-receiving unit 330, and an address event detection unit 400.

The light-receiving unit 330 photoelectrically converts the incident light to generate a photocurrent. The light-receiving unit 330 includes a transfer transistor 331, an overflow gate (OFG) transistor 332, and a photoelectric conversion element 333. N-type metal-oxide-semiconductor (MOS) transistors are used as the transfer transistor 331 and the OFG transistor 332, for example.

The pixel signal generation unit 320 generates an analog signal having a voltage corresponding to the photocurrent as a pixel signal Vsig. The pixel signal generation unit 320 includes a reset transistor 321, an amplification transistor 322, a selection transistor 323, and a floating diffusion layer 324. N-type MOS transistors are used as the reset transistor 321, the amplification transistor 322, and the selection transistor 323, for example.

Furthermore, the photoelectric conversion elements 333 are arranged on the light-receiving chip 201. All the elements other than the photoelectric conversion elements 333 are arranged on the detection chip 202. Note that the elements arranged on the light-receiving chip 201 and the detection chip 202 are not limited to this configuration. For example, the transfer transistor 331, the OFG transistor 332, or part of the address event detection unit 400 can be further arranged on the light-receiving chip 201.

The photoelectric conversion element 333 photoelectrically converts the incident light to generate a charge. The transfer transistor 331 transfers the charge from the photoelectric conversion element 333 to the floating diffusion layer 324 according to a transfer signal TRG from the drive circuit 211. The OFG transistor 332 causes the photocurrent generated by the photocurrent generated by the photoelectric conversion element 333 to flow into the address event detection unit 400 according to a control signal OFG from the drive circuit 211.

The floating diffusion layer 324 accumulates the charge and generates a voltage according to the amount of the charge. The reset transistor 321 initializes the charge amount of the floating diffusion layer 324 according to a reset signal RST from the drive circuit 211. The amplification transistor 322 amplifies the voltage of the floating diffusion layer 324. The selection transistor 323 outputs a signal of an amplified voltage to the column ADC 220 via a vertical signal line 308 as the pixel signal Vsig according to a selection signal SEL from the drive circuit 211.

The address event detection unit 400 detects the presence or absence of an address event according to whether or not the amount of change in the photocurrent of the light-receiving unit 330 has exceeded a predetermined threshold.

The address event includes an on-event in which the amount of change in the photocurrent according to the incident light amount has exceeded an upper limit threshold, and an off-event in which the amount of change has fallen below a lower limit threshold, for example. In other words, the address event is detected when the amount of change in the incident light amount falls outside a predetermined range from the lower limit to the upper limit. Furthermore, the detection signal of the address event includes one bit indicating the detection result of the on-event and one bit indicating the detection result of the off-event, for example. Note that the address event detection unit 400 can detect only the on-event.

The address event detection unit 400 transmits a request for requesting transmission of a detection signal to the Y arbiter 213 when the address event has occurred. Then, when receiving a response to the request from the Y arbiter 213, the address event detection unit 400 transmits detection signals DET+ and DET− to the drive circuit 211 and the column ADC 220. Here, the detection signal DET+ is a signal indicating the detection result of the presence or absence of the on-event, and is transmitted to the column ADC 220 via a detection signal line 306, for example. Furthermore, the detection signal DET− is a signal indicating the detection result of the presence or absence of the off-event, and is transmitted to the column ADC 220 via a detection signal line 307, for example.

Furthermore, the address event detection unit 400 sets a column enable signal ColEN to be enabled in synchronization with the selection signal SEL, and transmits the signal to the column ADC 220 via an enable signal line 309. Here, the column enable signal ColEN is a signal for enabling or disabling analog to digital (AD) conversion for the pixel signal of a corresponding column. Note that the address event detection unit 400 is an example of a detection unit described in the claims.

When an address event is detected in a certain row, the drive circuit 211 drives the row by the selection signal SEL or the like. Each of the pixels 310 in the driven row generates the pixel signal Vsig and transmits the pixel signal Vsig to the column ADC 220. Furthermore, the pixel 310 that has detected the address event in the driven row transmits the enabled column enable signal ColEN to the column ADC 220. Meanwhile, the column enable signal ColEN of the pixel 310 that has not detected the address event is set to be disabled.

Figure 5:
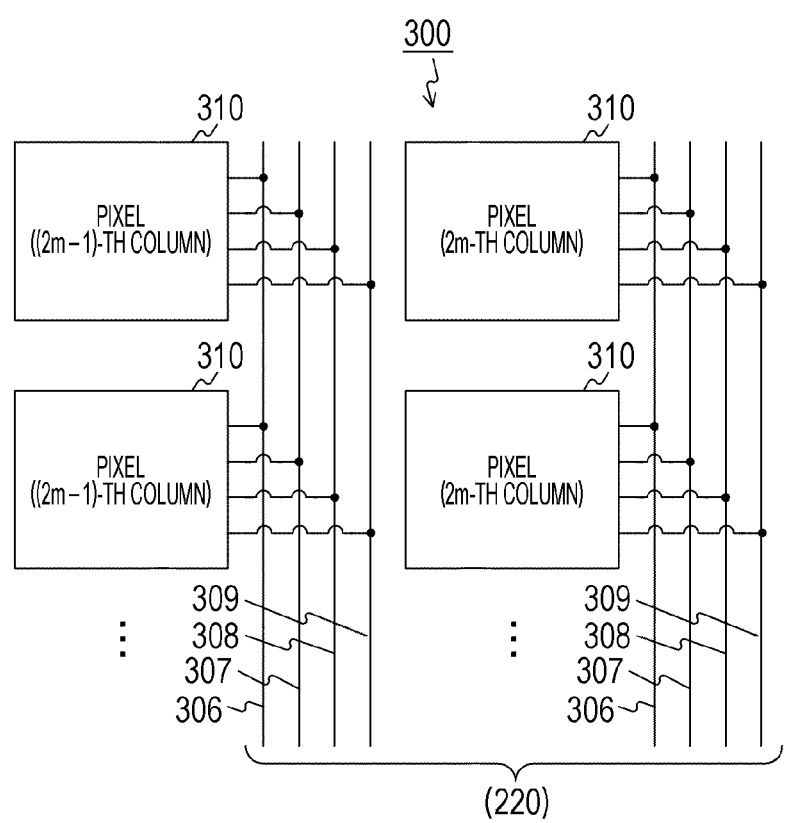
FIG. 5 is a plan view illustrating a configuration example of a pixel array unit according to the first embodiment of the present technology.

FIG. 5 is a plan view illustrating a configuration example of the pixel array unit 300 according to the first embodiment of the present technology. As illustrated in FIG. 5, in the pixel array unit 300, four lines of the detection signal lines 306 and 307, the vertical signal line 308, and the enable signal line 309 are wired for each column along a column direction. Each of the pixels 310 is connected to the detection signal lines 306 and 307, the vertical signal line 308, and the enable signal line 309 of the corresponding column.

[Configuration Example of Address Event Detection Unit]

Figure 6:
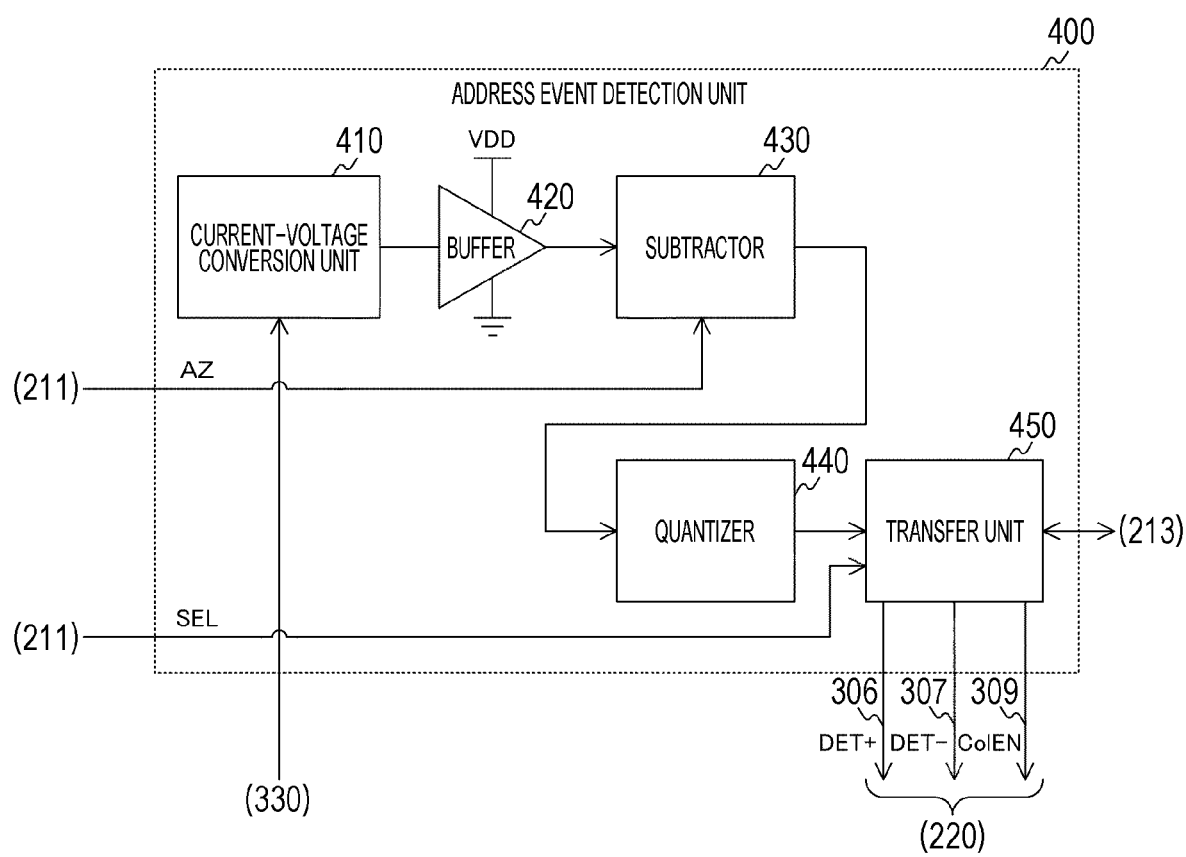
FIG. 6 is a block diagram illustrating a configuration example of an address event detection unit according to the first embodiment of the present technology.

FIG. 6 is a block diagram illustrating a configuration example of the address event detection unit 400 according to the first embodiment of the present technology. The address event detection unit 400 includes a current-voltage conversion unit 410, a buffer 420, a subtractor 430, a quantizer 440, and a transfer unit 450.

The current-voltage conversion unit 410 converts the photocurrent from the light-receiving unit 330 into a logarithmic voltage signal. The current-voltage conversion unit 410 supplies the voltage signal to the buffer 420.

The buffer 420 outputs the voltage signal from the current-voltage conversion unit 410 to the subtractor 430. The buffer 420 can improve a drive force for driving a rear stage. Furthermore, the buffer 420 can secure isolation of noise associated with a rear-stage switching operation.

The subtractor 430 lowers a level of the voltage signal from the buffer 420 according to a row drive signal from the drive circuit 211. The subtractor 430 supplies the lowered voltage signal to the quantizer 440.

The quantizer 440 quantizes the voltage signal from the subtractor 430 into a digital signal and outputs the digital signal to the transfer unit 450 as a detection signal.

The transfer unit 450 transfers the detection signal from the quantizer 440 to the signal processing unit 212 and the like. The transfer unit 450 transmits a request for requesting transmission of the detection signal to the Y arbiter 213 when an address event is detected. Then, when receiving a response to the request from the Y arbiter 213, the transfer unit 450 supplies the detection signals DET+ and DET− to the drive circuit 211 and the column ADC 220. Furthermore, the transfer unit 450 transmits the enabled column enable signal ColEN to the column ADC 220 when the selection signal SEL is transmitted.

[Configuration Example of Current-Voltage Conversion Unit]

Figure 7:
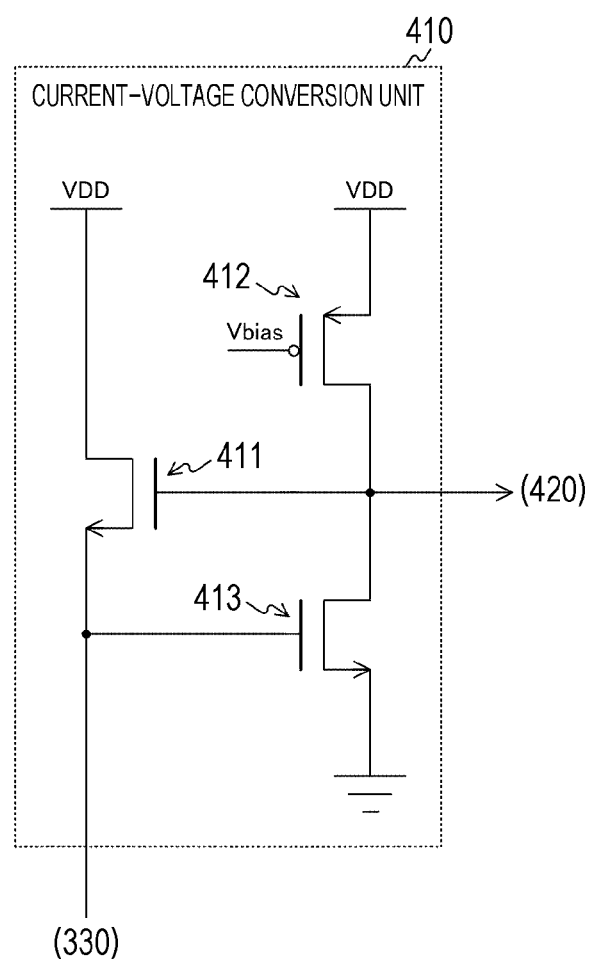
FIG. 7 is a circuit diagram illustrating a configuration example of a current-voltage conversion unit according to the first embodiment of the present technology.

FIG. 7 is a circuit diagram illustrating a configuration example of the current-voltage conversion unit 410 according to the first embodiment of the present technology. The current-voltage conversion unit 410 includes N-type transistors 411 and 413 and a P-type transistor 412. For example, MOS transistors are used as these transistors.

A source of the N-type transistor 411 is connected to the light-receiving unit 330 and a drain of the N-type transistor 411 is connected to a power supply terminal. The P-type transistor 412 and the N-type transistor 413 are connected in series between the power supply terminal and a ground terminal. Furthermore, a connection point between the P-type transistor 412 and the N-type transistor 413 is connected to a gate of the N-type transistor 411 and an input terminal of the buffer 420. Furthermore, a predetermined bias voltage Vbias is applied to a gate of the P-type transistor 412.

Drains of the N-type transistors 411 and 413 are connected to a power supply side, and such a circuit is called source follower. The photocurrent from the light-receiving unit 330 is converted into a logarithmic voltage signal by these two source followers connected in a loop manner. Furthermore, the P-type transistor 412 supplies a constant current to the N-type transistor 413.

[Configuration Example of Subtractor and Quantizer]

Figure 8:
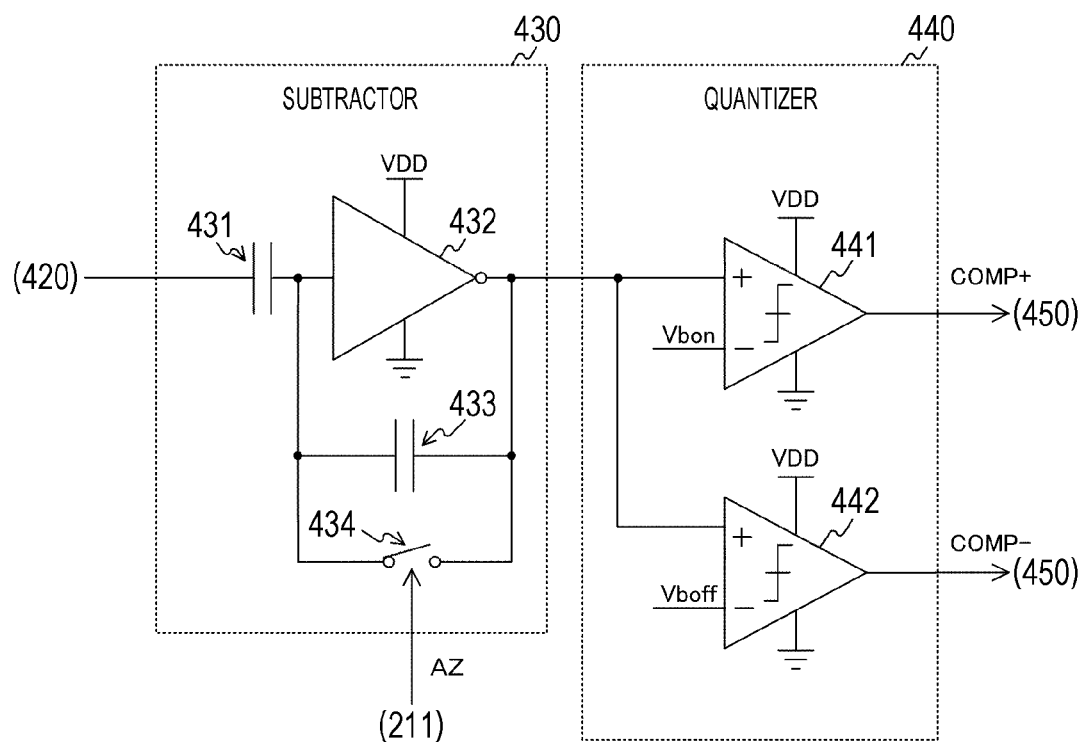
FIG. 8 is a circuit diagram illustrating a configuration example of a subtractor and a quantizer according to the first embodiment of the present technology.

FIG. 8 is a circuit diagram illustrating a configuration example of the subtractor 430 and the quantizer 440 according to the first embodiment of the present technology. The subtractor 430 includes capacitors 431 and 433, an inverter 432, and a switch 434. Furthermore, the quantizer 440 includes comparators 441 and 442.

One end of the capacitor 431 is connected to an output terminal of the buffer 420, and the other end of the capacitor 431 is connected to an input terminal of the inverter 432. The capacitor 433 is connected in parallel with the inverter 432. The switch 434 opens and closes a path connecting both ends of the capacitor 433 according to an auto-zero signal AZ from the drive circuit 211.

The inverter 432 inverts the voltage signal input via the capacitor 431. The inverter 432 outputs an inverted signal to the non-inverting input terminal (+) of the comparator 441.

When the switch 434 is turned on, a voltage signal $V_{init}$ is input to the buffer 420 side of the capacitor 431, and an opposite side becomes a virtual ground terminal. A potential of this virtual ground terminal is set to zero for convenience. At this time, a potential $Q_{init}$ accumulated in the capacitor 431 is expressed by the following expression, where C1 is a capacitance of the capacitor 431. Meanwhile, since both ends of the capacitor 433 are short-circuited, the accumulated charge is zero.

$$Q_{init}=C1 \times V_{init} \qquad \text{Expression 1}$$

Next, considering a case where the switch 434 is turned off and the voltage on the buffer 420 side of the capacitor 431 changes to $V_{after}$, a charge $Q_{after}$ accumulated in the capacitor 431 is expressed by the following expression.

$$Q_{after}=C1 \times V_{after} \qquad \text{Expression 2}$$

Meanwhile, a charge Q2 accumulated in the capacitor 433 is expressed by the following expression, where an output voltage is $V_{out}$.

$$Q2=-C2 \times V_{out} \qquad \text{Expression 3}$$

At this time, a total charge amount of the capacitors 431 and 433 does not change, and therefore the following expression holds.

$$Q_{init}=Q_{after}+Q2 \qquad \text{Expression 4}$$

By substituting Expressions 1 to 3 into Expression 4 and transforming the expression, the following expression is obtained.

$$V_{out}=-(C1/C2) \times (V_{after}-V_{init}) \qquad \text{Expression 5}$$

The expression 5 expresses a subtraction operation of the voltage signal, and a gain of the subtraction result is C1/C2. Since it is usually desired to maximize the gain, it is favorable to design C1 large and C2 small. On the other hand, if C2 is too small, kTC noise increases, and noise characteristics may deteriorate. Therefore, the capacity reduction of C2 is limited to a range in which noise is tolerable. Furthermore, since the address event detection unit 400 including the subtractor 430 is mounted for each pixel block, there is a restriction on the area of the capacitors C1 and C2. The values of the capacitors C1 and C2 are determined in consideration of the above matters.

The comparator 441 compares the voltage signal from the subtractor 430 with an upper limit voltage Vbon applied to the inverting input terminal (−). Here, the upper limit voltage Vbon is a voltage indicating an upper limit threshold. The comparator 441 outputs a comparison result COMP+ to the transfer unit 450. The comparator 441 outputs a high-level comparison result COMP+ in a case where an on-event has occurred and outputs a low-level comparison result COMP+ in a case where there is no on-event.

The comparator 442 compares the voltage signal from the subtractor 430 with a lower limit voltage Vboff applied to the inverting input terminal (−). Here, the lower limit voltage Vboff is a voltage indicating a lower limit threshold. The comparator 442 outputs the comparison result COMP− to the transfer unit 450. The comparator 442 outputs a high-level comparison result COMP− in a case where an off-event has occurred and outputs the low-level comparison result COMP− in a case where there is no on-event.

[Configuration Example of Transfer Unit]

Figure 9:
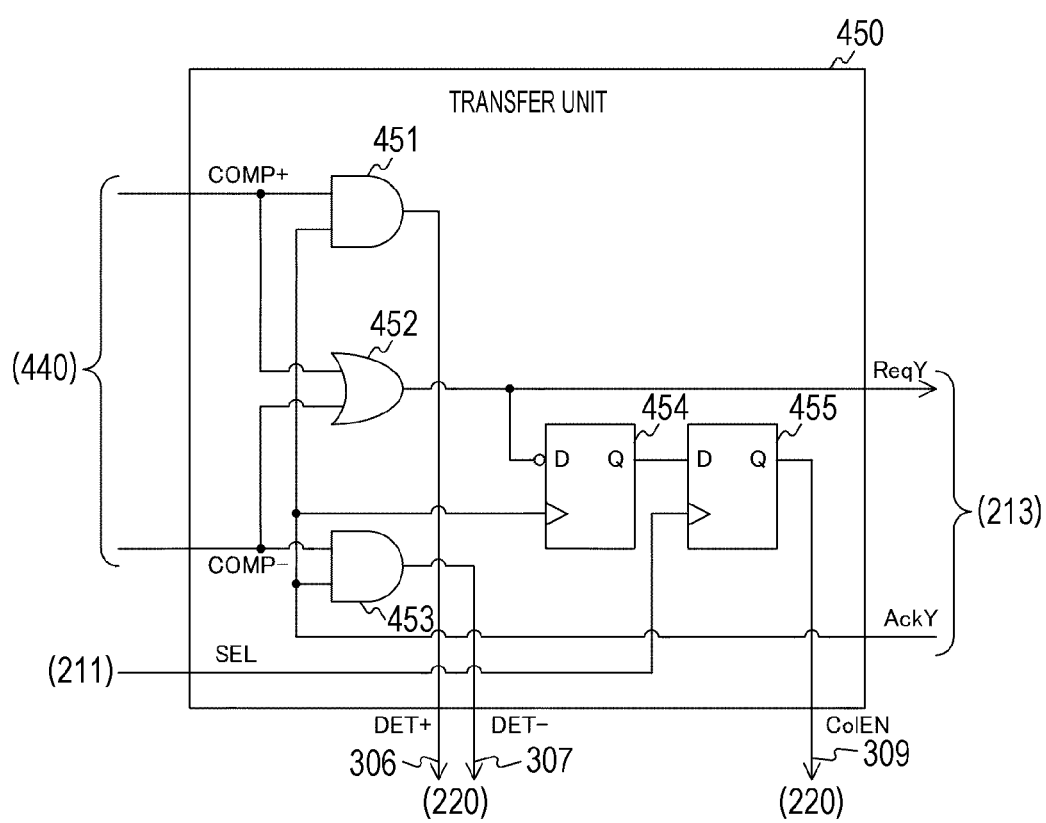
FIG. 9 is a circuit diagram illustrating a configuration example of a transfer unit according to the first embodiment of the present technology.

FIG. 9 is a circuit diagram illustrating a configuration example of the transfer unit 450 according to the first embodiment of the present technology. The transfer unit 450 includes AND (logical product) gates 451 and 453, an OR (logical sum) gate 452, and flip-flops 454 and 455.

The AND gate 451 outputs a logical product of the comparison result COMP+ of the quantizer 440 and a response AckY from the Y arbiter 213 to the column ADC 220 as the detection signal DET+. The AND gate 451 outputs a high-level detection signal DET+ in a case where an on-event has occurred and outputs a low-level detection signal DET+ in a case where there is no on-event.

The OR gate 452 outputs a logical sum of the comparison result COMP+ and the comparison result COMP− of the quantizer 440 to the Y arbiter 213 as a request ReqY. The OR gate 452 outputs a high-level request ReqY in a case where an address event has occurred and outputs a low-level request ReqY in a case where there is no address event. Furthermore, an inverted value of the request ReqY is input to an input terminal D of the flip-flop 454.

The AND gate 453 outputs a logical product of the comparison result COMP− of the quantizer 440 and the response AckY from the Y arbiter 213 to the column ADC 220 as a detection signal DET−. The AND gate 453 outputs a high-level detection signal DET− in a case where an off-event has occurred and outputs a low-level detection signal DET− in a case where there is no off-event.

The flip-flop 454 holds the inverted value of the request ReqY in synchronization with the response AckY. The flip-flop 454 outputs the held value to the input terminal D of the flip-flop 455 as an internal signal ColEN'.

The flip-flop 455 holds the internal signal ColEN' in synchronization with the selection signal SEL from the drive circuit 211. The flip-flop 455 outputs the held value to the column ADC 220 as the column enable signal ColEN.

[Configuration Example of Column ADC]

Figure 10:
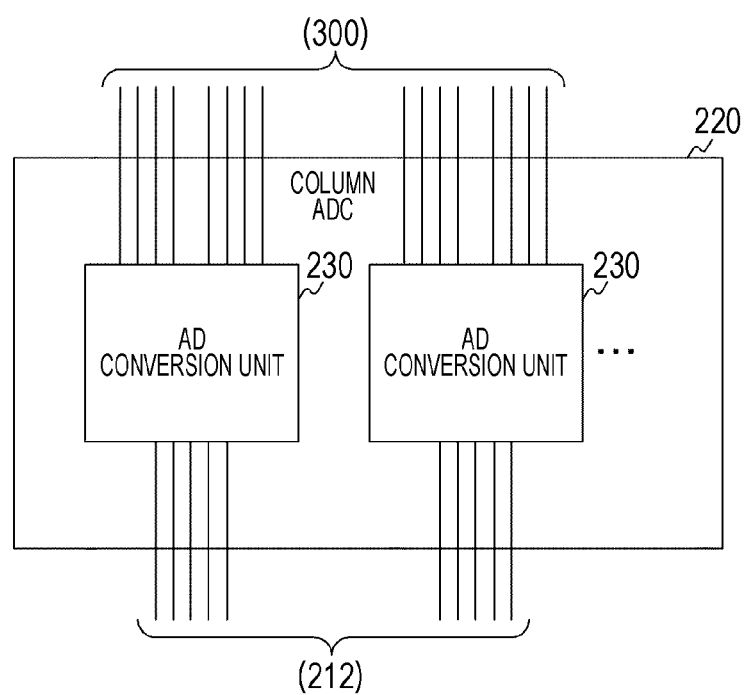
FIG. 10 is a block diagram illustrating a configuration example of an analog to digital converter (ADC) according to the first embodiment of the present technology.

FIG. 10 is a block diagram illustrating a configuration example of the column ADC 220 according to the first embodiment of the present technology. In the column ADC 220, an AD conversion unit 230 is arranged for each K (K is an integer of 2 or more) columns. For example, the AD conversion unit 230 is provided for each two columns. In this case, the number of AD conversion units 230 is M when the number of columns is 2M (M is an integer).

The AD conversion unit 230 converts an analog pixel signal from at least one of the corresponding two columns into a digital signal.

[Configuration Example of AD Conversion Unit]

Figure 11:
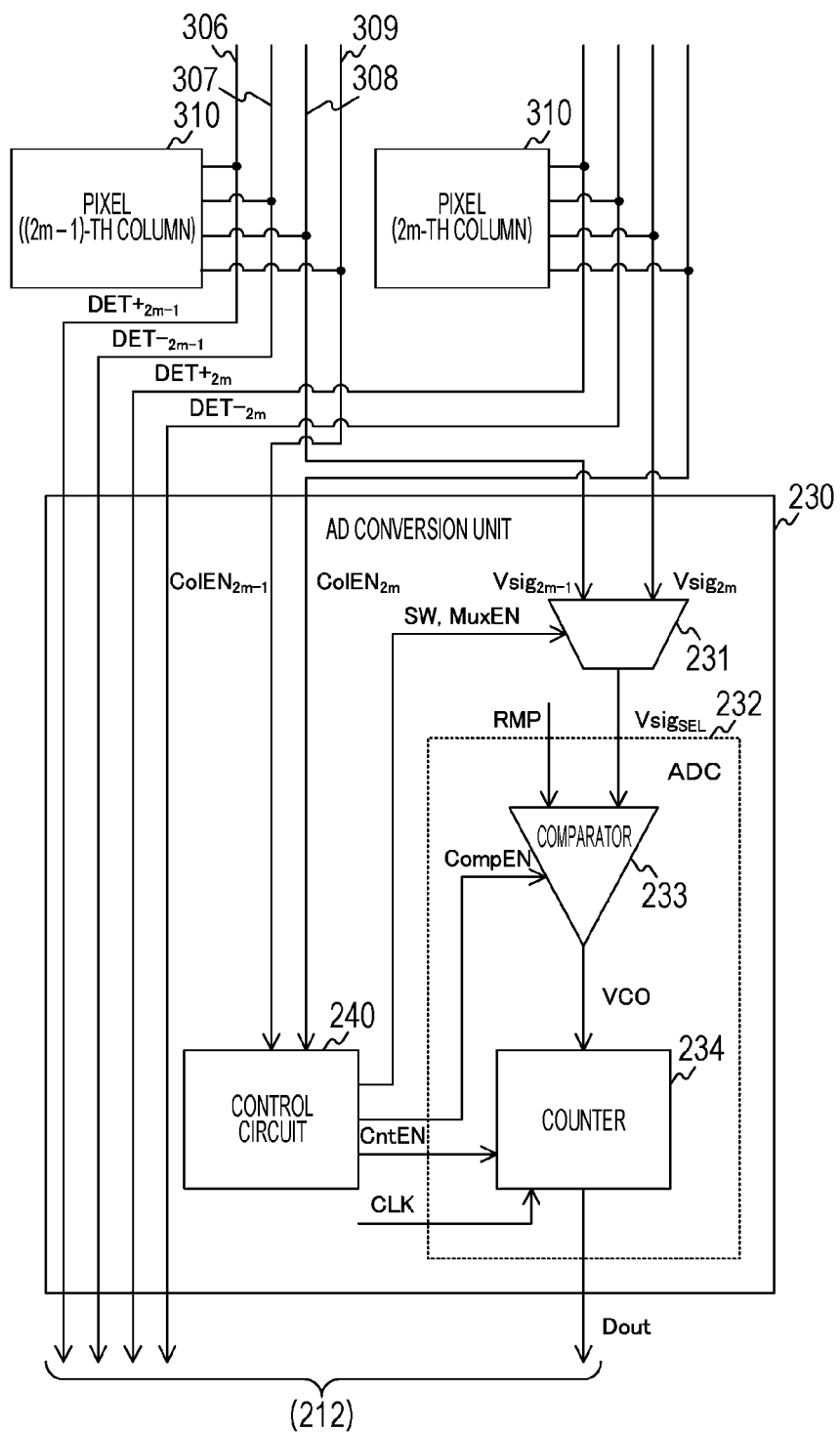
FIG. 11 is a block diagram illustrating a configuration example of an AD conversion unit according to the first embodiment of the present technology.

FIG. 11 is a block diagram illustrating a configuration example of the AD conversion unit 230 according to the first embodiment of the present technology. The AD conversion unit 230 includes a multiplexer 231, an ADC 232, and a control circuit 240. Two columns corresponding to the AD conversion unit 230 are a (2m−1)-th (m is an integer of 1 to M) column and a 2m-th column.

The multiplexer 231 selects one of a pixel signal $Vsig_{2m-1}$ of the (2m−1)-th column and a pixel signal $Vsig_{2m}$ of the 2m-th column according to a control signal from the control circuit 240 and outputs the selected pixel signal to the ADC 232 as a pixel signal $Vsig_{SEL}$. A switching signal SW and a multiplexer enable signal MuxEN are input to the multiplexer 231 as control signals. Note that the multiplexer 231 is an example of a selection unit described in the claims.

The ADC 232 converts the pixel signal $Vsig_{SEL}$ into a digital signal Dout. The ADC 232 includes a comparator 233 and a counter 234. Note that the ADC 232 is an example of an analog-digital converter described in the claims.

The comparator 233 compares a predetermined reference signal RMP with the pixel signal $Vsig_{SEL}$ according to a comparator enable signal CompEN from the control circuit

240. As the reference signal RMP, for example, a ramp signal that changes in a slope manner is used. Furthermore, the comparator enable signal CompEN is a signal for enabling or disabling the comparison operation of the comparator 233. The comparator 233 supplies a comparison result VCO to the counter 234.

The counter 234 counts a count value in synchronization with a clock signal CLK over a period until the comparison result VCO is inverted according to a counter enable signal CntEN from the control circuit 240. The counter enable signal CntEN is a signal for enabling or disabling the count operation of the counter 234. The counter 234 outputs the digital signal Dout indicating the count value to the signal processing unit 212.

The control circuit 240 controls the multiplexer 231 and the ADC 232 according to the column enable signals $ColEN_{2m-1}$ and $ColEN_{2m}$ of the (2m−1)-th column and the 2m-th column. Details of control content will be described below.

Furthermore, the detection signals DET+ and DET− of each column are output to the signal processing unit 212 via the AD conversion unit 230.

Note that a single slope-type ADC including the comparator 233 and the counter 234 is used as the ADC 232. However, the configuration is not limited thereto. For example, a delta-sigma-type ADC can be used as the ADC 232.

Figure 12:
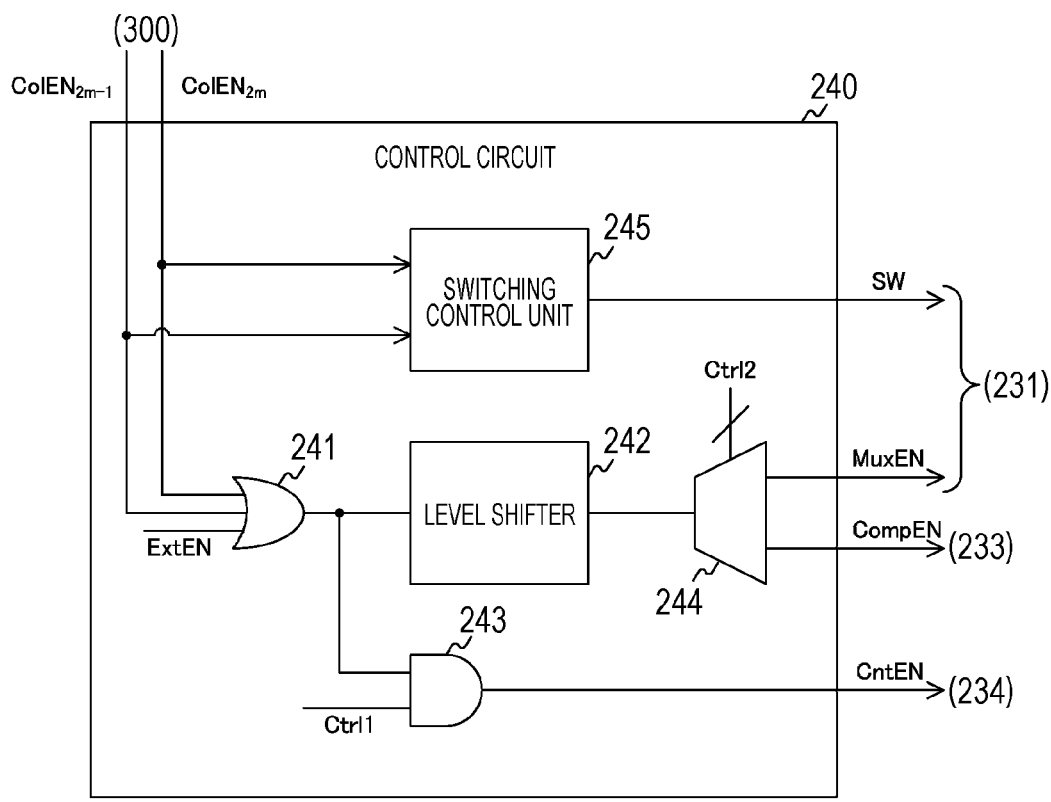
FIG. 12 is a block diagram illustrating a configuration example of a control circuit according to the first embodiment of the present technology.

FIG. 12 is a block diagram illustrating a configuration example of the control circuit 240 according to the first embodiment of the present technology. The control circuit 240 includes an OR (logical sum) gate 241, a level shifter 242, an AND (logical product) gate 243, a demultiplexer 244, and a switching control unit 245.

The OR gate 241 outputs a logical sum of the column enable signals $ColEN_{2m-1}$ and $ColEN_{2m}$ and an extra enable signal ExtEN to the level shifter 242 and the AND gate 243. The extra enable signal ExtEN is a signal for giving an instruction for enabling of AD conversion regardless of the presence or absence of an address event, and is set according to a user operation. For example, the extra enable signal ExtEN is set to a high level in a case of enabling AD conversion and is set to a low level in a case of disabling AD conversion.

The level shifter 242 converts a voltage of an output signal of the OR gate 241. The converted signal is input to the demultiplexer 244.

The AND gate 243 outputs a logical product of the output signal of the OR gate 241 and a block control signal Crtl1 to the counter 234 as the counter enable signal CntEN. The block control signal Crtl1 is a signal for disabling the counter 234 regardless of the presence or absence of an address event. For example, the block control signal Crtl1 is set to a low level in a case of disabling the counter 234 and is set to a high level otherwise regardless of the presence or absence of an address event.

The demultiplexer 244 distributes an output signal of the level shifter 242 to the multiplexer 231 and the comparator 233 according to a block control signal Crtl2. The block control signal Crtl2 is a signal for disabling at least either the multiplexer 231 or the comparator 233 regardless of the presence or absence of an address event.

For example, a binary number "10" is set to the block control signal Crtl2 in a case of disabling only the multiplexer 231 regardless of the presence or absence of an address event. At this time, the output signal of the level shifter 242 is output to the comparator 233 as the comparator enable signal CompEN. A binary number "01" is set to the block control signal Crtl2 in a case of disabling only the comparator 233. At this time, the output signal of the level shifter 242 is output to the multiplexer 231 as the multiplexer enable signal MuxEN. Furthermore, "00" is set in a case of disabling both the multiplexer 231 and the comparator 233 and "11" is set otherwise. The output signal of the level shifter 242 is output to both the multiplexer 231 and the comparator 233 when "11" is set.

The switching control unit 245 switches the pixel signal output from the multiplexer 231 on the basis of the column enable signals $ColEN_{2m-1}$ and $ColEN_{2m}$. The switching control unit 245 causes the multiplexer 231 to select the pixel signal of the enabled column by the switching signal SW in the case where enable is set for one column. The switching control unit 245 causes the multiplexer 231 to select the pixel signal of one column by the switching signal SW, and then causes the multiplexer 231 to select the pixel signal of the other column in the case where enable is set for both the two columns.

FIG. 13 is diagrams for describing readout control according to the first embodiment of the present technology. a and b in FIG. 13 are diagrams for describing readout control in a case where an address event has occurred in only one of the (2m−1)-th column and the 2m-th column. c in FIG. 13 is diagrams for describing readout control in a case where an address event has occurred in both the (2m−1)-th column and the 2m-th column.

In a case where an address event has occurred in one of the (2m−1)-th column and the 2m-th column and no address event has occurred in the other column, only the pixel 310 of the column in which the address event occurs transmits the column enable signal ColEN. Meanwhile, the column enable signal ColEN of the column having no address event is set to be disabled.

In this case, the control circuit 240 in the column ADC 220 causes the multiplexer 231 to select the enabled column by the switching signal SW. For example, in the case where the (2m−1)-th column is enabled, the control circuit 240 causes the multiplexer 231 to select the column by the switching signal SW, as illustrated in a in FIG. 13. On the other hand, in the case where the 2m-th column is enabled, the control circuit 240 causes the multiplexer 231 to select that column, as illustrated in b in FIG. 13.

Furthermore, the control circuit 240 sets the ADC 232 to be enabled by the comparator enable signal CompEN and the counter enable signal CntEN over a certain AD conversion period.

In the case where an address event has occurred in both (2m−1)-th and 2m-th columns, the pixel 310 in each column transmits the enabled column enable signal ColEN. In this case, the control circuit 240 causes the multiplexer 231 to select one of the (2m−1)-th column and the 2m-th column and then causes the multiplexer 231 to select the other column, as illustrated in c in FIG. 13. Furthermore, the control circuit 240 enables the ADC 232 over the AD conversion periods of the (2m−1)-th column and the 2m-th column. Note that the column ADC 220 is an example of an analog-digital conversion unit described in the claims.

Furthermore, in the case where both the (2m−1)-th row and the 2m-th row are disabled, the control circuit 240 sets the ADC 232 to be disabled.

As described above, the AD conversion unit 230 performs AD conversion for only the pixel signal of the pixel 310 in which the address event has occurred among the pixels 310 in the row in which the address event has occurred, and does not perform AD conversion for the remaining pixels. As a result, power consumption can be reduced as compared with a case where all the pixel signals in the row in which the address event has occurred are AD-converted.

[Operation Example of Solid-State Image Sensor]

Figure 14:
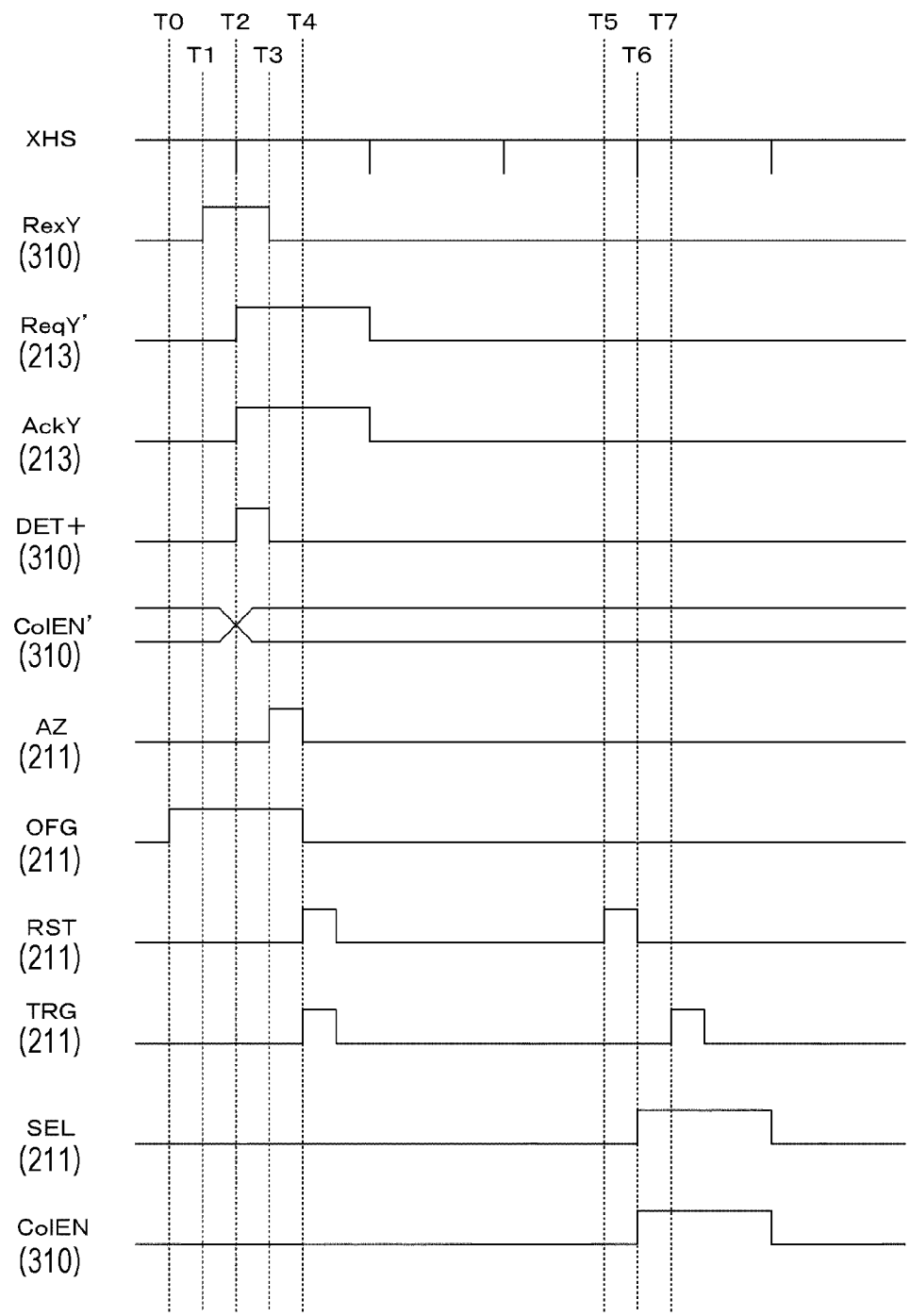
FIG. 14 is a timing chart illustrating an example of an operation of the solid-state image sensor according to the first embodiment of the present technology.

FIG. 14 is a timing chart illustrating an example of an operation of the solid-state image sensor 200 according to the first embodiment of the present technology. At timing T0, the drive circuit 211 sets the control signal OFG to the high level and drives the OFG transistor 332. As a result, detection of the presence or absence of an address event is started.

At timing T1, when an address event (such as an on-event) occurs, the pixel 310 transmits the high-level request ReqY to the Y arbiter 213.

At timing T2 immediately after timing T1, the Y arbiter 213 holds the request ReqY as a request ReqY'. Furthermore, the Y arbiter 213 arbitrates the request and returns the response AckY. The pixel 310 that has received this response AckY outputs the high-level detection signal DET+, for example. Furthermore, the pixel 310 inverts the request ReqY and holds the request ReqY in the flip-flop 455 as the internal signal ColEN'.

At timing T3, the drive circuit 211 that has received the detection signal DET+ supplies the high-level auto-zero signal AZ to initialize the address event detection unit 400. Next, at timing T4, the drive circuit 211 sets the control signal OFG to the low level and supplies the high-level reset signal RST and TRG. As a result, exposure is started.

At timing T5 immediately before the end of exposure in synchronization with a horizontal synchronous signal XHS, the drive circuit 211 supplies the high-level reset signal RST to initialize the floating diffusion layer 324. Then, at timing T6, the drive circuit 211 supplies the high-level selection signal SEL. The pixel 310 supplies the high-level column enable signal ColEN in synchronization with the selection signal SEL. As a result, the reset level is AD-converted. Here, the reset level is the level of the pixel signal when the floating diffusion layer 324 is initialized.

Next, at timing T7, the drive circuit 211 supplies the high-level transfer signal TRG to transfer the charge to the floating diffusion layer 324. As a result, the signal level is AD-converted. Here, the signal level is the level of the pixel signal at the end of exposure.

Figure 15:
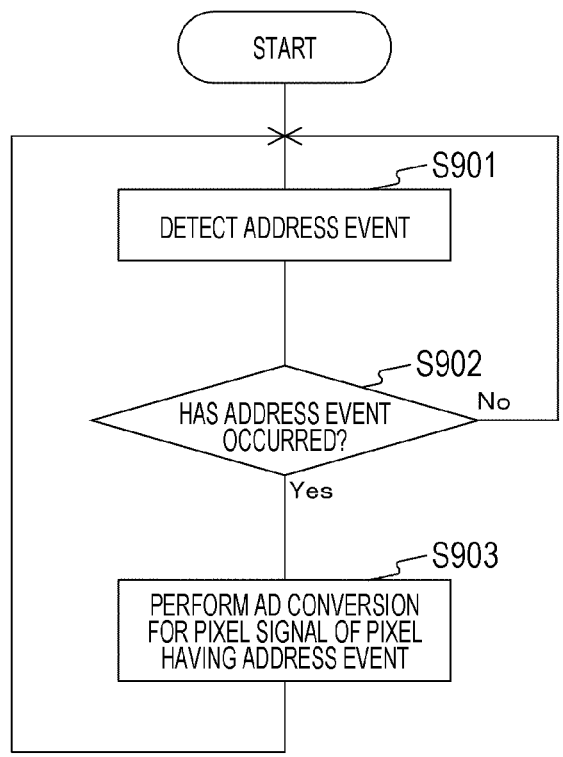
FIG. 15 is a flowchart illustrating an example of an operation of the solid-state image sensor according to the first embodiment of the present technology.

FIG. 15 is a flowchart illustrating an example of an operation of the solid-state image sensor 200 according to the first embodiment of the present technology. This operation is started when an application for detecting and capturing an address event is executed, for example. The solid-state image sensor 200 detects the presence or absence of an address event (step S901) and determines whether or not the address event has occurred (step S902). When the address event has occurred (step S902: Yes), the column ADC 220 AD-converts only the pixel signal of the pixel 310 having the address event (step S903).

In a case where no address event has occurred (step S902: No) or after step S903, the solid-state image sensor 200 repeatedly executes step S901 and the subsequent steps.

As described above, according to the first embodiment of the present technology, the pixel signal of the pixel 310 having the amount of change in the incident light amount that falls outside the range from the lower limit to the upper limit (that is, the pixel 310 in which an address event has occurred) is AD-converted. Therefore, the number of times of AD conversion can be minimized. That is, focusing on a certain row, in a case where an address event has occurred in any of a plurality of pixels in the row, only the pixel signal of that pixel is AD-converted. As a result, the power consumption required for AD conversion when capturing an image can be reduced as compared with the case of AD-converting the pixel signals of all the pixels in the row. Therefore, a high-quality image can be easily captured while detecting the presence or absence of an address event.

2. Second Embodiment

In the above-described first embodiment, in the case where an address event has occurred in both the (2m−1)-th column and the 2m-th column, the multiplexer 231 has sequentially selected the columns one by one and performed the AD conversion for the pixel signal. However, in this control method, the AD conversion is sequentially performed column by column. Therefore, an AD conversion (that is, readout) speed becomes slower than a case of performing AD conversion for only one column. A solid-state image sensor 200 according to a second embodiment is different from that of the first embodiment in reading a plurality of pixel signals in parallel without using a multiplexer 231.

Figure 16:
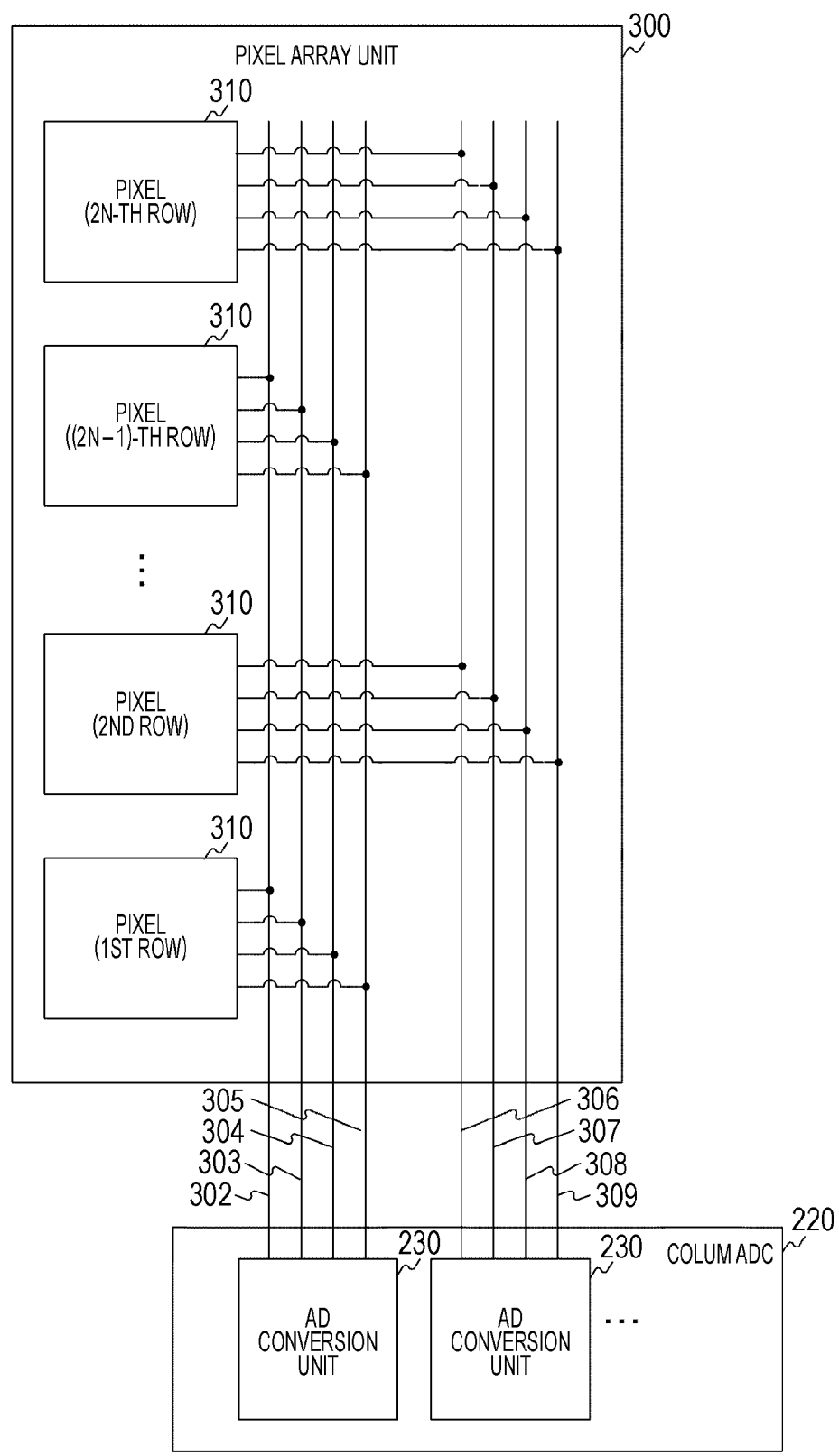
FIG. 16 is a block diagram illustrating a configuration example of a pixel array unit and a column ADC according to a second embodiment of the present technology.

FIG. 16 is a block diagram illustrating a configuration example of a pixel array unit 300 and a column ADC 220 according to the second embodiment of the present technology. In the pixel array unit 300 of the second embodiment, detection signal lines 302, 303, 306 and 307, vertical signal lines 304 and 308, and enable signal lines 305 and 309 are wired for each column. The pixel 310 in the 2n-th row (n is an integer of 1 to N) where the number of rows is 2N (N is an integer) is connected to the detection signal lines 306 and 307, the vertical signal line 308, and the enable signal line 309. Meanwhile, the pixel 310 in the (2n−1)-th row is connected to the detection signal lines 302 and 303, the vertical signal line 304, and the enable signal line 305.

Furthermore, in the column ADC 220, two AD conversion units 230 are arranged for each column. One of the two AD conversion units 230 performs AD conversion for the pixel signal of the 2n-th row of the corresponding column and the other AD conversion unit 230 performs AD conversion for the (2n−1)-th row.

Figure 17:
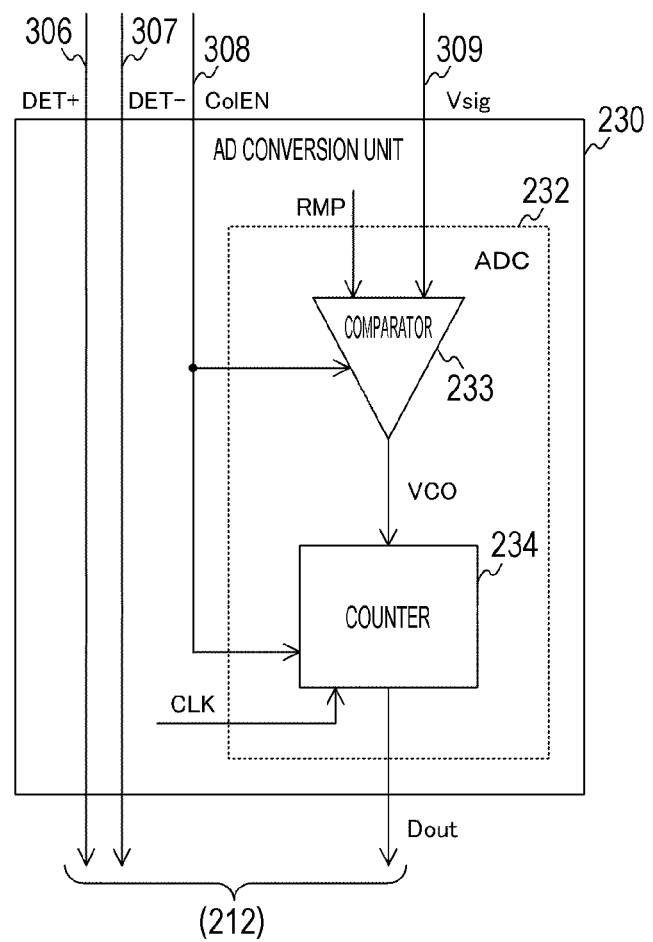
FIG. 17 is a block diagram illustrating a configuration example of an AD conversion unit according to the second embodiment of the present technology.

FIG. 17 is a block diagram illustrating a configuration example of the AD conversion unit 230 according to the second embodiment of the present technology. The AD conversion unit 230 according to the second embodiment is different from that of the first embodiment in that a multiplexer 231 and a control circuit 240 are not arranged.

The ADC 232 according to the second embodiment performs AD conversion for the pixel signal Vsig of the corresponding column according to the column enable signal ColEN of the corresponding column.

With the configuration illustrated in FIGS. 16 and 17, the AD conversion unit 230 of the (2m−1)-th column and the AD conversion unit 230 of the 2m-th column can perform the AD conversion in parallel in a case where an address event has occurred in both the (2m−1)-th column and the 2m-th column. Furthermore, the AD conversion unit 230 corresponding to the (2n−1)-th row and the AD conversion unit 230 of the 2n-th row can perform the AD conversion in parallel in a case where an address event has occurred in both the (2n−1)-th row and the 2n-th column.

Note that two AD conversion units 230 are arranged for each column. However, one AD conversion unit 230 may be arranged for each column. Further, three or more AD conversion units 230 may be arranged for each column and three or more rows may be AD-converted in parallel.

As described above, according to the second embodiment of the present technology, the two AD conversion units 230 for each column perform the AD conversion for the pixel signals of the (2n−1)-th row and 2n-th row in parallel. Therefore, the AD conversion (readout) speed can be improved as compared with the case of performing AD conversion row by row.

3. Third Embodiment

In the above-described second embodiment, all the AD conversion units 230 are arranged in the column ADC 220. However, the circuit scale of the column ADC 220 increases as the number of pixels increases. A solid-state image sensor 200 according to a third embodiment is different from that of the second embodiment in that a plurality of AD conversion units 230 is arranged in a distributed manner between an upper-side column ADC and a lower-side column ADC.

Figure 18:
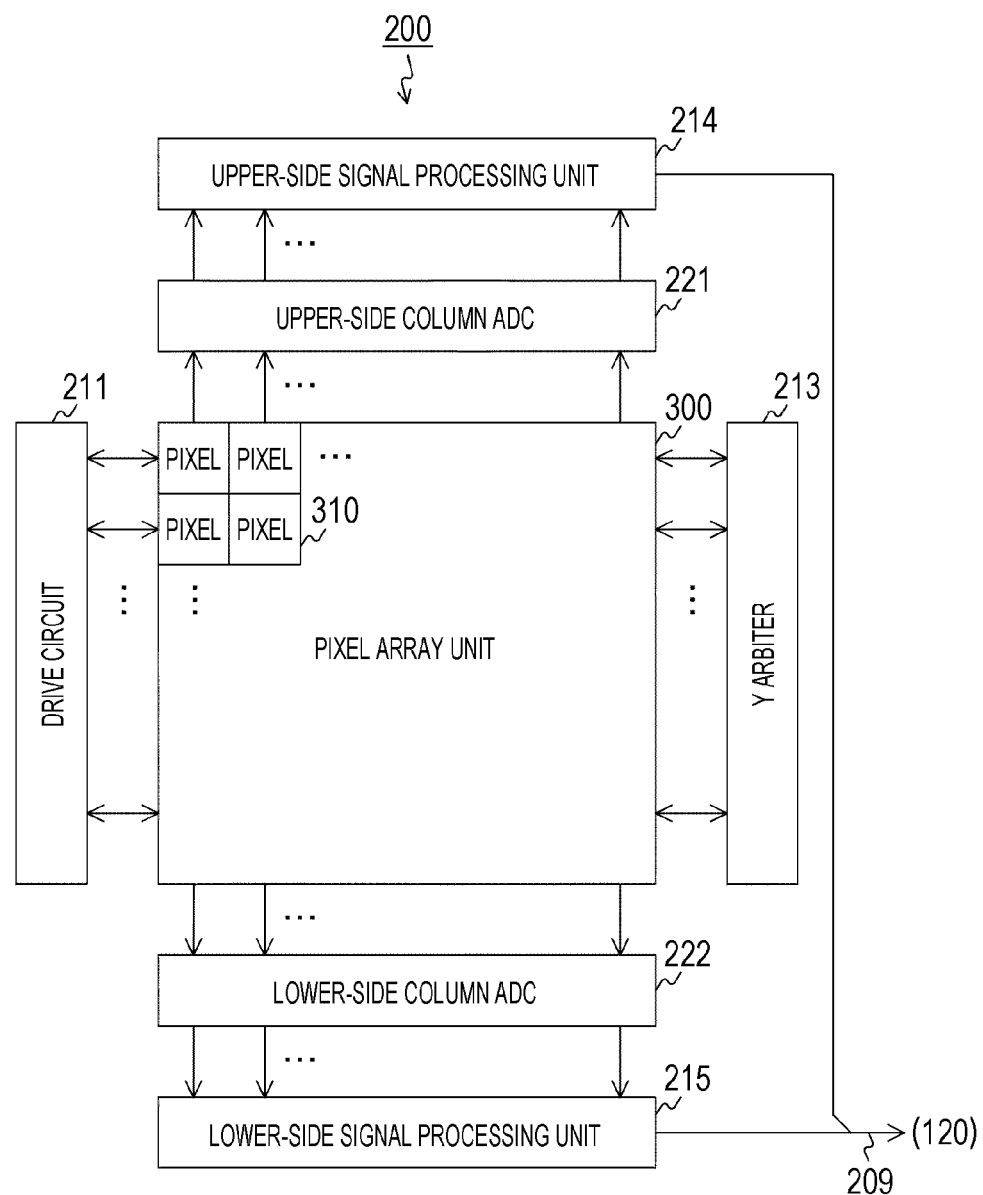
FIG. 18 is a block diagram illustrating a configuration example of a solid-state image sensor according to a third embodiment of the present technology.

FIG. 18 is a block diagram illustrating a configuration example of the solid-state image sensor 200 according to the third embodiment of the present technology. In the solid-state image sensor 200 according to the third embodiment, an upper-side column ADC 221 and a lower-side column ADC 222 are arranged instead of the column ADC 220, and an upper-side signal processing unit 214 and a lower-side signal processing unit 215 are arranged instead of the signal processing unit 212.

The upper-side column ADC 221 performs AD conversion for a pixel signal of the 2n-th row, and the upper-side signal processing unit 214 processes a digital signal and a detection signal of the row. Meanwhile, the lower-side column ADC 222 performs AD conversion for a pixel signal of the (2n−1)-th row, and the lower-side signal processing unit 215 processes a digital signal and a detection signal of the row.

Figure 19:
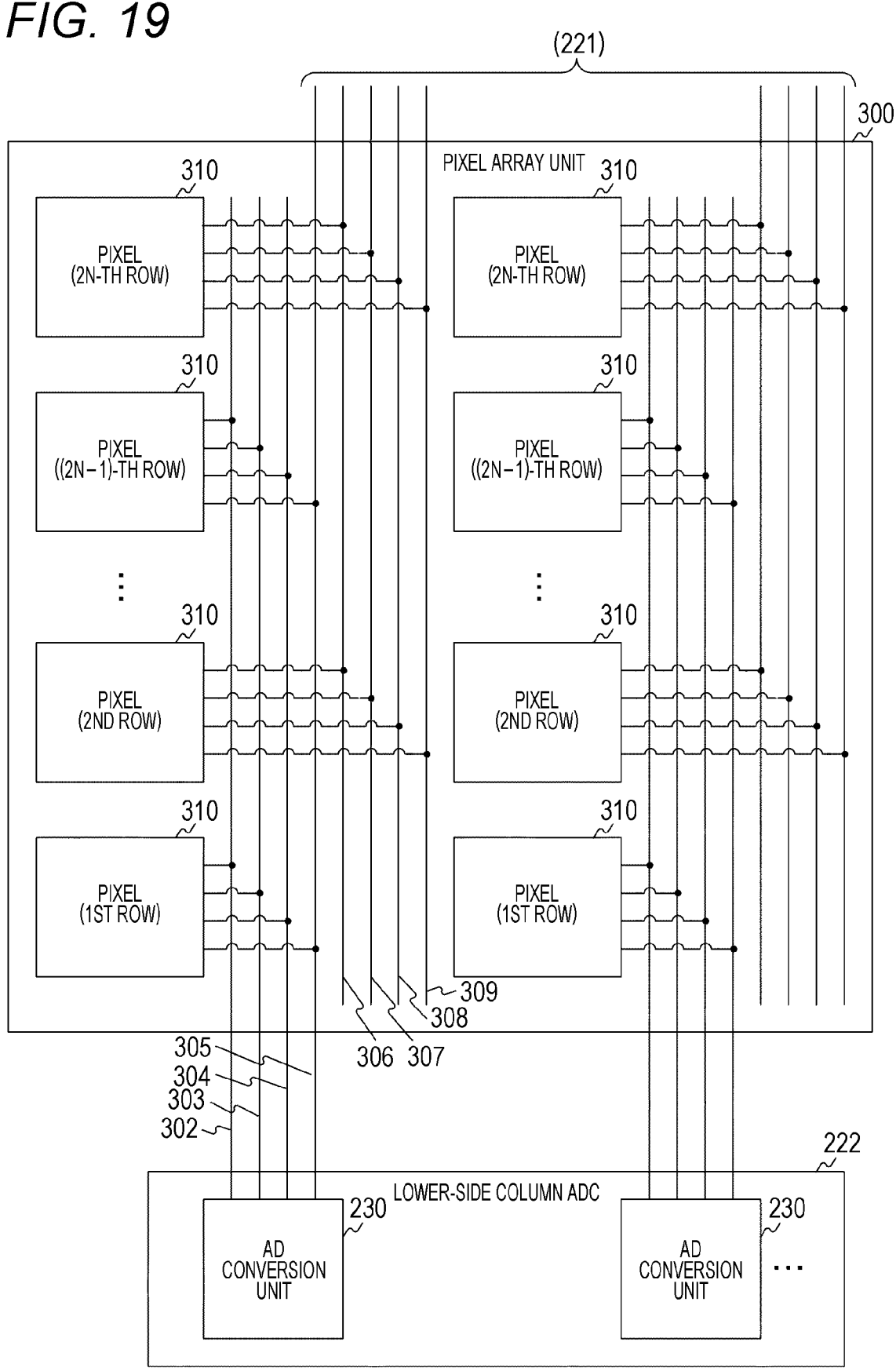
FIG. 19 is a block diagram illustrating a configuration example of a pixel array unit and a lower-side column ADC according to the third embodiment of the present technology.

FIG. 19 is a block diagram illustrating a configuration example of a pixel array unit 300 and the lower-side column ADC 222 according to the third embodiment of the present technology. The configuration of the pixel array unit 300 of the third embodiment is similar to that of the second embodiment. However, a pixel 310 of the 2n-th row is connected to the upper-side column ADC 221 and a pixel 310 of the (2n−1)-th row is connected to the lower-side column ADC 222.

The AD conversion unit 230 is arranged for each column in the lower-side column ADC 222. The configuration of the AD conversion unit 230 of the third embodiment is similar to that of the second embodiment without the multiplexer 231. Similarly, the AD conversion unit 230 is arranged for each column in the upper-side column ADC 221.

With the configuration illustrated in FIGS. 18 and 19, the upper-side column ADC 221 and the lower-side column ADC 222 can perform the AD conversion in parallel in a case where an address event has occurred in both the (2n−1)-th row and the 2n-th column. Note that the upper-side column ADC 221 is an example of a first analog-digital conversion unit described in the claims, and the lower-side column ADC 222 is an example of a second analog-digital conversion unit described in the claims.

As described above, according to the third embodiment of the present technology, the 2N AD conversion units 230 are arranged in a distribution manner between the upper-side column ADC 221 and the lower-side column ADC 222. Therefore, the circuit scale per column ADC can be reduced.

4. Fourth Embodiment

In the above-described third embodiment, the AD conversion units 230 are arranged for each column in the upper-side column ADC 221 and the lower-side column ADC 222. However, the respective circuit scales of the column ADCs increase as the number of pixels increases. A solid-state image sensor 200 according to a fourth embodiment is different from that of the third embodiment in that AD conversion unit 230 is arranged for each two columns in each of an upper-side column ADC 221 and a lower-side column ADC 222.

Figure 20:
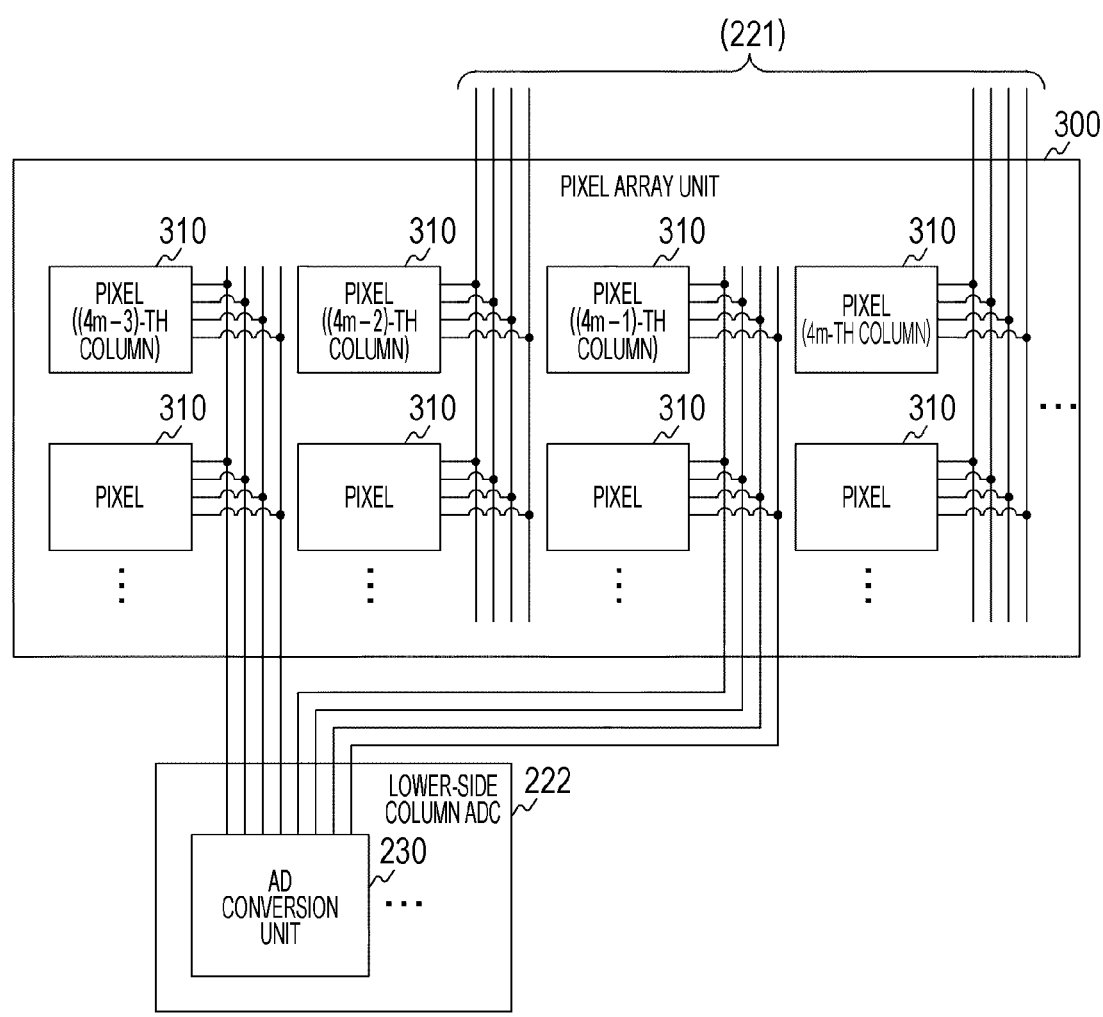
FIG. 20 is a block diagram illustrating a configuration example of a pixel array unit and a lower-side column ADC according to a fourth embodiment of the present technology.

FIG. 20 is a block diagram illustrating a configuration example of a pixel array unit 300 and the lower-side column ADC 222 according to the fourth embodiment of the present technology. In the pixel array unit 300 of the fourth embodiment, four signal lines are wired for each column as in the first embodiment. Furthermore, when the number of columns is 4M, the 4m-th column and the (4m−2)-th column are connected to the upper-side column ADC 221, and the (4m−1)-th column and the (4m−3)-th column are connected to the lower-side column ADC 222.

The AD conversion unit 230 is arranged for each K columns with respect to the total of connected 2M columns in the lower-side column ADC 222 of the fourth embodiment. In a case where K is "2", M AD conversion units 230 are arranged. Furthermore, the configuration of the AD conversion unit 230 of the fourth embodiment is similar to that of the first embodiment with the multiplexer 231. Similarly, the AD conversion unit 230 is arranged for each two columns in the upper-side column ADC 221 of the fourth embodiment.

As described above, according to the fourth embodiment of the present technology, the AD conversion unit 230 is arranged for each two columns. Therefore, the respective circuit scales of the upper-side column ADC 221 and the lower-side column ADC 222 can be reduced as compared with the case of arranging the AD conversion unit 230 for each column.

5. Fifth Embodiment

In the above-described first embodiment, the Y arbiter 213 in the solid-state image sensor 200 has arbitrated the requests from a plurality of rows but has not arbitrated requests from a plurality of columns. In this configuration, in a case where an address event has occurred in a plurality of pixels in a row substantially at the same time, the detection signals of these pixels are output to the signal processing unit 212 substantially at the same time, and the processing load of the signal processing unit 212 increases. A solid-state image sensor 200 according to the fifth embodiment is different from that of the first embodiment in that an X arbiter adjusts requests from a plurality of columns.

Figure 21:
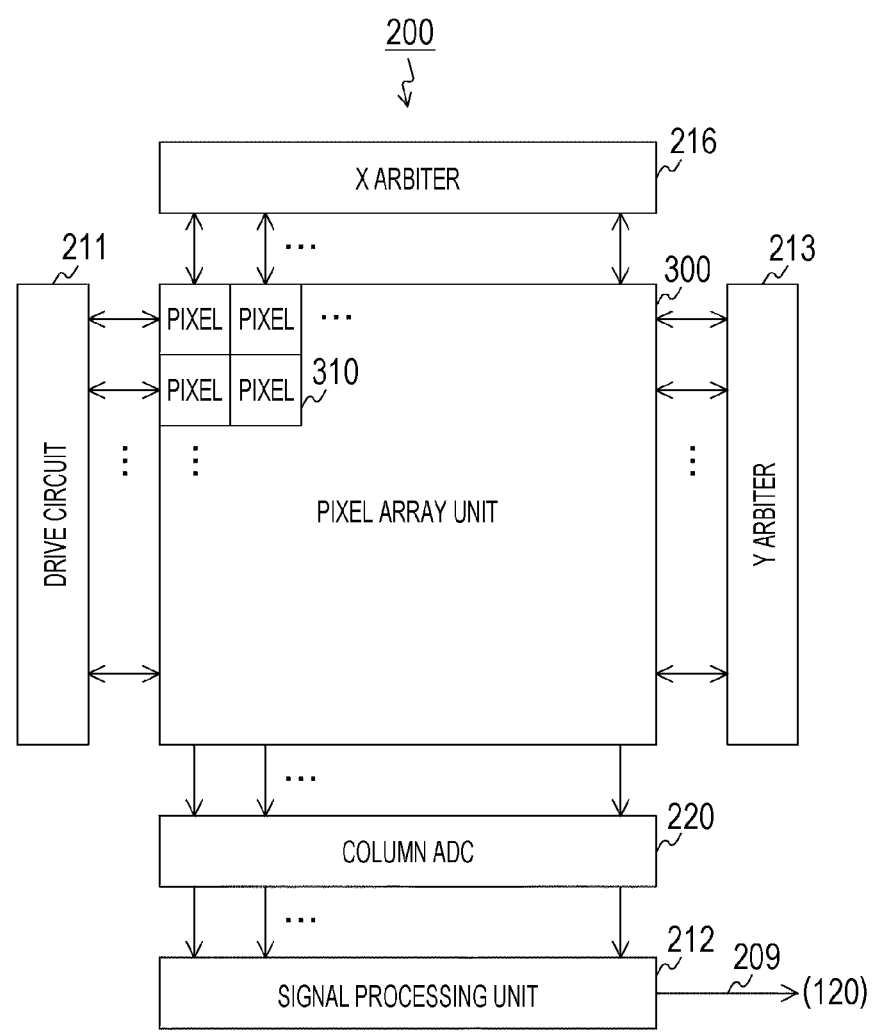
FIG. 21 is a block diagram illustrating a configuration example of a solid-state image sensor according to a fifth embodiment of the present technology.

FIG. 21 is a block diagram illustrating a configuration example of the solid-state image sensor 200 according to the fifth embodiment of the present technology. The solid-state image sensor 200 according to the fifth embodiment is different from that in the first embodiment in further including an X arbiter 216.

The X arbiter 216 arbitrates requests from a plurality of columns and returns a response on the basis of an arbitration result. By arbitrating the requests from a plurality of columns, in a case where an address event has occurred in a plurality of pixels in a row substantially at the same time, detection signal of these pixels can be sequentially supplied to the column ADC 220. Note that the X arbiter 216 is an example of a column arbiter described in the claims.

A pixel 310 according to the fifth embodiment transmits a request to the Y arbiter 213 when detecting an address event, and transmits a request to the X arbiter 216 when receiving a response from the Y arbiter 213. Then, the pixel 310 outputs a detection signal when receiving a response from the X arbiter 216.

Note that the configurations of the second to fourth embodiments can also be applied to the solid-state image sensor 200 of the fifth embodiment.

As described above, according to the fifth embodiment of the present technology, the X arbiter 216 arbitrates the requests from a plurality of columns. Therefore, in a case where an address event has occurred in a plurality of pixels in a row at substantially the same time, the detection signals of those pixels can be sequentially supplied.

[Modification]

In the above-described fifth embodiment, the pixel 310 has generated a column enable signal ColEN. However, in this configuration, a circuit (an OR gate 452, flip-flops 454 and 455, and the like) for generating the column enable signal ColEN needs to be arranged for each pixel. Therefore, the circuit scale of the pixel array unit 300 for that circuit increases. The solid-state image sensor 200 according to the modification of the fifth embodiment is different from that of the fifth embodiment in that the X arbiter 216 generates the column enable signal ColEN instead of the pixel 310.

Figure 22:
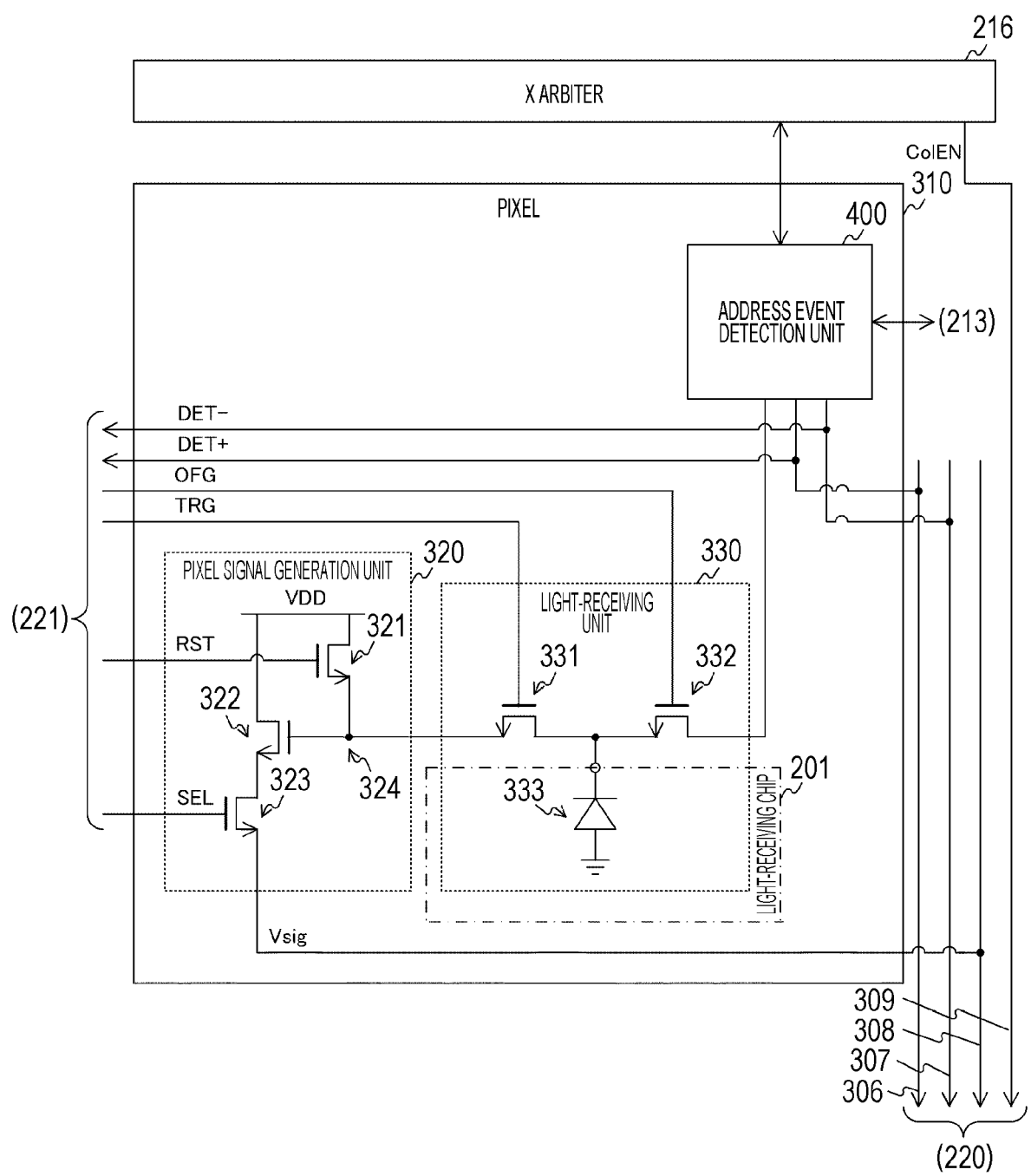
FIG. 22 is a block diagram illustrating a configuration example of a pixel and an X arbiter according to a modification of the fifth embodiment of the present technology.

FIG. 22 is a block diagram illustrating a configuration example of the pixel 310 and the X arbiter 216 according to the modification of the fifth embodiment of the present technology. In the pixel 310 according to the modification of the fifth embodiment, the address event detection unit 400 does not generate the column enable signal ColEN. Instead, the X arbiter 216 generates the column enable signal ColEN of the column in which an address event has occurred and supplies the column enable signal ColEN to the column ADC 220.

Note that the configurations of the second to fourth embodiments can also be applied to the solid-state image sensor 200 of the modification of the fifth embodiment.

As described above, in the modification of the fifth embodiment of the present technology, the X arbiter 216 generates the column enable signal ColEN. Therefore, there is no need to arrange the circuit for generating the column enable signal ColEN in the pixel 310. As a result, the circuit scale of the pixel 310 can be reduced.

6. Imaging Device According to Sixth Embodiment (Scan Method)

The above-described imaging device 20 according to the first embodiment is an asynchronous imaging device that reads events by an asynchronous readout method. However, the event readout method is not limited to the asynchronous readout method and may be the synchronous readout method. An imaging device to which the synchronous readout method is applied is a scan-type imaging device, which is the same as a normal imaging device that performs imaging at a predetermined frame rate.

Figure 23:
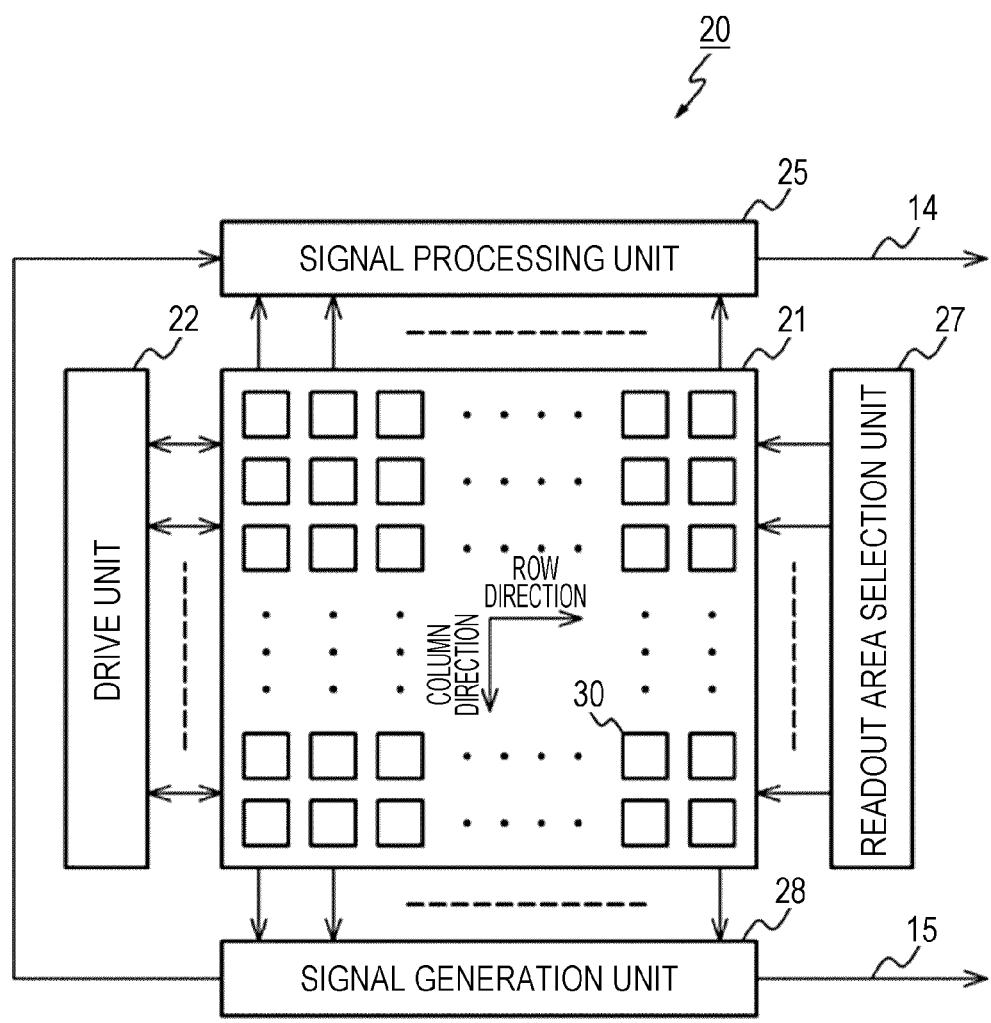
FIG. 23 is a block diagram illustrating a configuration example of an imaging device according to a sixth embodiment of the present technology.

FIG. 23 is a block diagram illustrating an example of a configuration of an imaging device according to a sixth embodiment, that is, a scan-type imaging device, which is used as an imaging device 20 in an imaging system 10 to which the technology according to the present disclosure is applied.

As illustrated in FIG. 23, the imaging device 20 according to the sixth embodiment as the imaging device of the present disclosure includes a pixel array unit 21, a drive unit 22, a signal processing unit 25, a readout area selection unit 27, and a signal generation unit 28.

The pixel array unit 21 includes a plurality of pixels 30. The plurality of pixels 30 outputs output signals in response to a selection signal from the readout area selection unit 27. The configuration of each of the plurality of pixels 30 is similar to that of the pixel 310 illustrated in FIG. 4. The plurality of pixels 30 outputs output signals corresponding to the amount of change in light intensity. The plurality of pixels 30 may be two-dimensionally arranged in a matrix as illustrated in FIG. 22.

The drive unit 22 drives each of the plurality of pixels 30 and causes the signal processing unit 25 to output the pixel signal generated in each pixel 30. Note that the drive unit 22 and the signal processing unit 25 are circuit units for acquiring gradation information. Therefore, in a case of acquiring only event information, the drive unit 22 and the signal processing unit 25 may be omitted.

The readout area selection unit 27 selects part of the plurality of pixels 30 included in the pixel array unit 21. Specifically, the readout area selection unit 27 determines a selected area in response to a request from each pixel 30 of the pixel array unit 21. For example, the readout area selection unit 27 selects any one or a plurality of rows from among rows included in a structure of a two-dimensional matrix corresponding to the pixel array unit 21. The readout area selection unit 27 sequentially selects one or a plurality of rows according to a preset cycle. Furthermore, the readout area selection unit 27 may determine the selected area in response to a request from each pixel 30 of the pixel array unit 21.

The signal generation unit 28 generates an event signal corresponding to an active pixel that has detected an event among the selected pixels on the basis of the output signals of the pixels selected by the readout area selection unit 27. The event is an event in which the intensity of light changes. The active pixel is a pixel in which the amount of change in the intensity of light corresponding to the output signal exceeds or falls below a preset threshold. For example, the signal generation unit 28 compares the output signal of the pixel with a reference signal, detects the active pixel that outputs the output signal in a case where the output signal is larger or smaller than the reference signal, and generates the event signal corresponding to the active pixel.

The signal generation unit 28 can include, for example, a column selection circuit that arbitrates signals entering the signal generation unit 28. Furthermore, the signal generation unit 28 may be configured to output not only the information of the active pixel in which an event is detected but also information of inactive pixels in which an event is not detected.

The signal generation unit 28 outputs address information and time stamp information (for example, (X, Y, T)) of the active pixel in which the event is detected through an output line 15. Note that data output from the signal generation unit 28 may be not only the address information and the time stamp information but also frame format information (for example, (0, 0, 1, 0, . . . )).

7. Application Examples to Moving Bodies

The technology according to the present disclosure (present technology) can be applied to various products. For example, the technology according to the present disclosure may be realized as a device mounted on any type of moving bodies including an automobile, an electric automobile, a hybrid electric automobile, a motorcycle, a bicycle, a personal mobility, an airplane, a drone, a ship, a robot, and the like.

Figure 24:
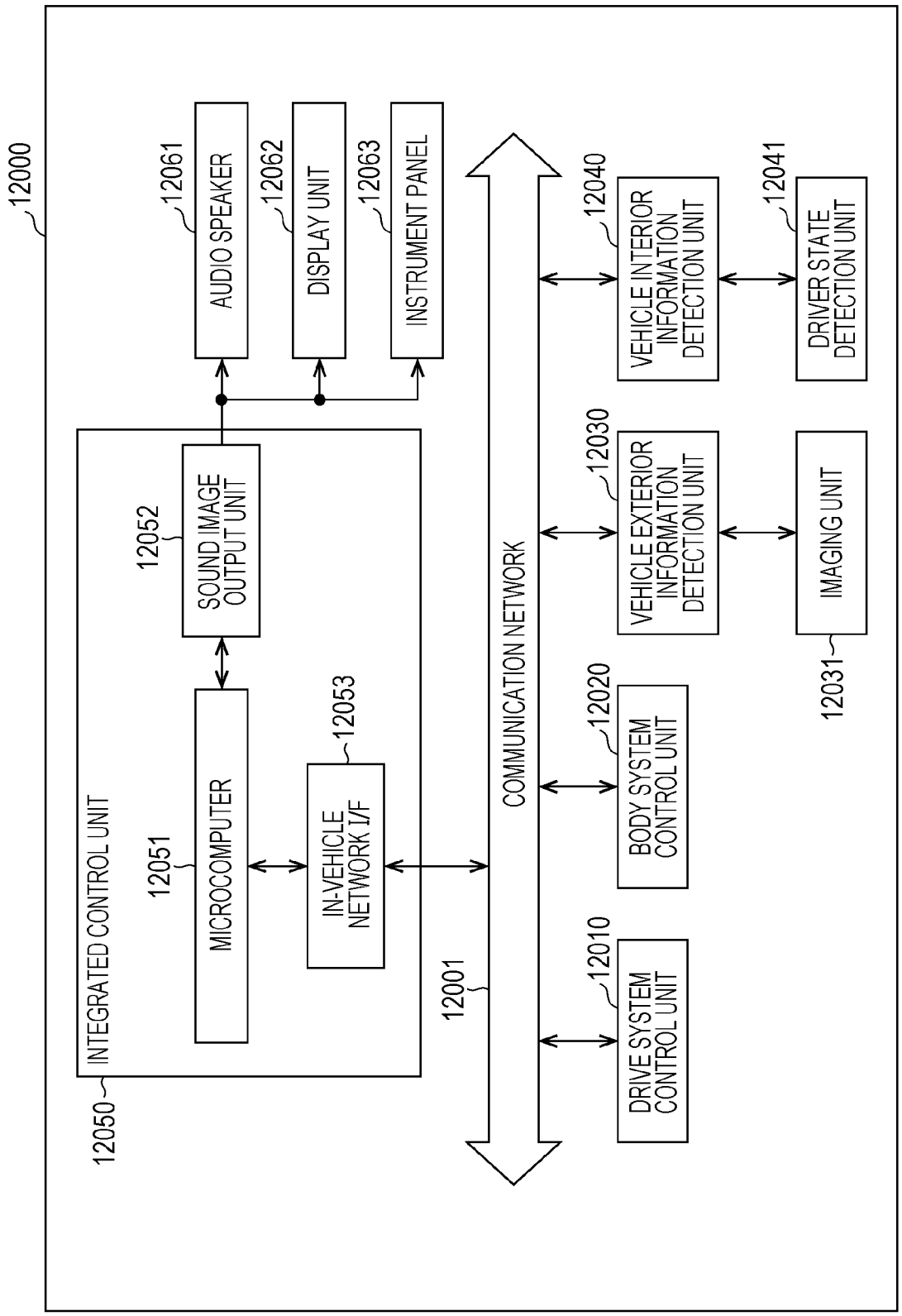
FIG. 24 is a block diagram illustrating a schematic configuration of a vehicle control system.

FIG. 24 is a block diagram illustrating a schematic configuration example of a vehicle control system as an example of a moving body control system to which the technology according to the present disclosure is applicable.

A vehicle control system 12000 includes a plurality of electronic control units connected through a communication network 12001. In the example illustrated in FIG. 24, the vehicle control system 12000 includes a drive system control unit 12010, a body system control unit 12020, a vehicle exterior information detection unit 12030, a vehicle interior information detection unit 12040, and an integrated control unit 12050. Furthermore, as functional configurations of the integrated control unit 12050, a microcomputer 12051, a sound image output unit 12052, and an in-vehicle network interface (I/F) 12053 are illustrated.

The drive system control unit 12010 controls operations of devices regarding a drive system of a vehicle according to various programs. For example, the drive system control unit 12010 functions as a control device of a drive force generation device for generating drive force of a vehicle, such as an internal combustion engine or a drive motor, a drive force transmission mechanism for transmitting drive force to wheels, a steering mechanism that adjusts a steering angle of a vehicle, a braking device that generates braking force of a vehicle, and the like.

The body system control unit 12020 controls operations of various devices equipped in a vehicle body according to various programs. For example, the body system control unit 12020 functions as a control device of a keyless entry system, a smart key system, an automatic window device, and various lamps such as head lamps, back lamps, brake lamps, turn signals, and fog lamps. In this case, radio waves transmitted from a mobile device substituted for a key or signals of various switches can be input to the body system control unit 12020. The body system control unit 12020 receives an input of the radio waves or the signals, and controls a door lock device, the automatic window device, the lamps, and the like of the vehicle.

The vehicle exterior information detection unit 12030 detects information outside the vehicle that mounts the vehicle control system 12000. For example, an imaging unit 12031 is connected to the vehicle exterior information detection unit 12030. The vehicle exterior information detection unit 12030 causes the imaging unit 12031 to capture an image outside the vehicle, and receives the captured image. The vehicle exterior information detection unit 12030 may perform object detection processing or distance detection processing of persons, vehicles, obstacles, signs, letters on a road surface, or the like on the basis of the received image.

The imaging unit 12031 is an optical sensor that receives light and outputs an electrical signal according to a light reception amount of the light. The imaging unit 12031 can output the electrical signal as an image and can output the electrical signal as information of distance measurement. Furthermore, the light received by the imaging unit 12031 may be visible light or may be non-visible light such as infrared light.

The vehicle interior information detection unit 12040 detects information inside the vehicle. A driver state detection unit 12041 that detects a state of a driver is connected to the vehicle interior information detection unit 12040, for example. The driver state detection unit 12041 includes a camera that captures the driver, for example, and the vehicle interior information detection unit 12040 may calculate the degree of fatigue or the degree of concentration of the driver, or may determine whether or not the driver falls asleep on the basis of the detection information input from the driver state detection unit 12041.

The microcomputer 12051 calculates a control target value of the drive force generation device, the steering mechanism, or the braking device on the basis of the information outside and inside the vehicle acquired in the vehicle exterior information detection unit 12030 or the vehicle interior information detection unit 12040, and can output a control command to the drive system control unit 12010. For example, the microcomputer 12051 can perform cooperative control for the purpose of realization of an advanced driver assistance system (ADAS) function including collision avoidance or shock mitigation of the vehicle, following travel based on a vehicular gap, vehicle speed maintaining travel, collision warning of the vehicle, lane out warning of the vehicle, and the like.

Furthermore, the microcomputer 12051 controls the drive force generation device, the steering mechanism, the braking device, or the like on the basis of the information of a vicinity of the vehicle acquired in the vehicle exterior information detection unit 12030 or the vehicle interior information detection unit 12040 to perform cooperative control for the purpose of automatic drive of autonomous travel without depending on an operation of the driver or the like.

Furthermore, the microcomputer 12051 can output a control command to the body system control unit 12020 on the basis of the information outside the vehicle acquired in the vehicle exterior information detection unit 12030. For example, the microcomputer 12051 can perform cooperative control for the purpose of achievement of non-glare such as by controlling the head lamps according to the position of a leading vehicle or an oncoming vehicle detected in the vehicle exterior information detection unit 12030, and switching high beam light to low beam light.

The sound image output unit 12052 transmits an output signal of at least one of a sound or an image to an output device that can visually and aurally notify a passenger of the vehicle or an outside of the vehicle of information. In the example in FIG. 24, as the output device, an audio speaker 12061, a display unit 12062, and an instrument panel 12063 are exemplarily illustrated. The display unit 12062 may include, for example, at least one of an on-board display or a head-up display.

Figure 25:
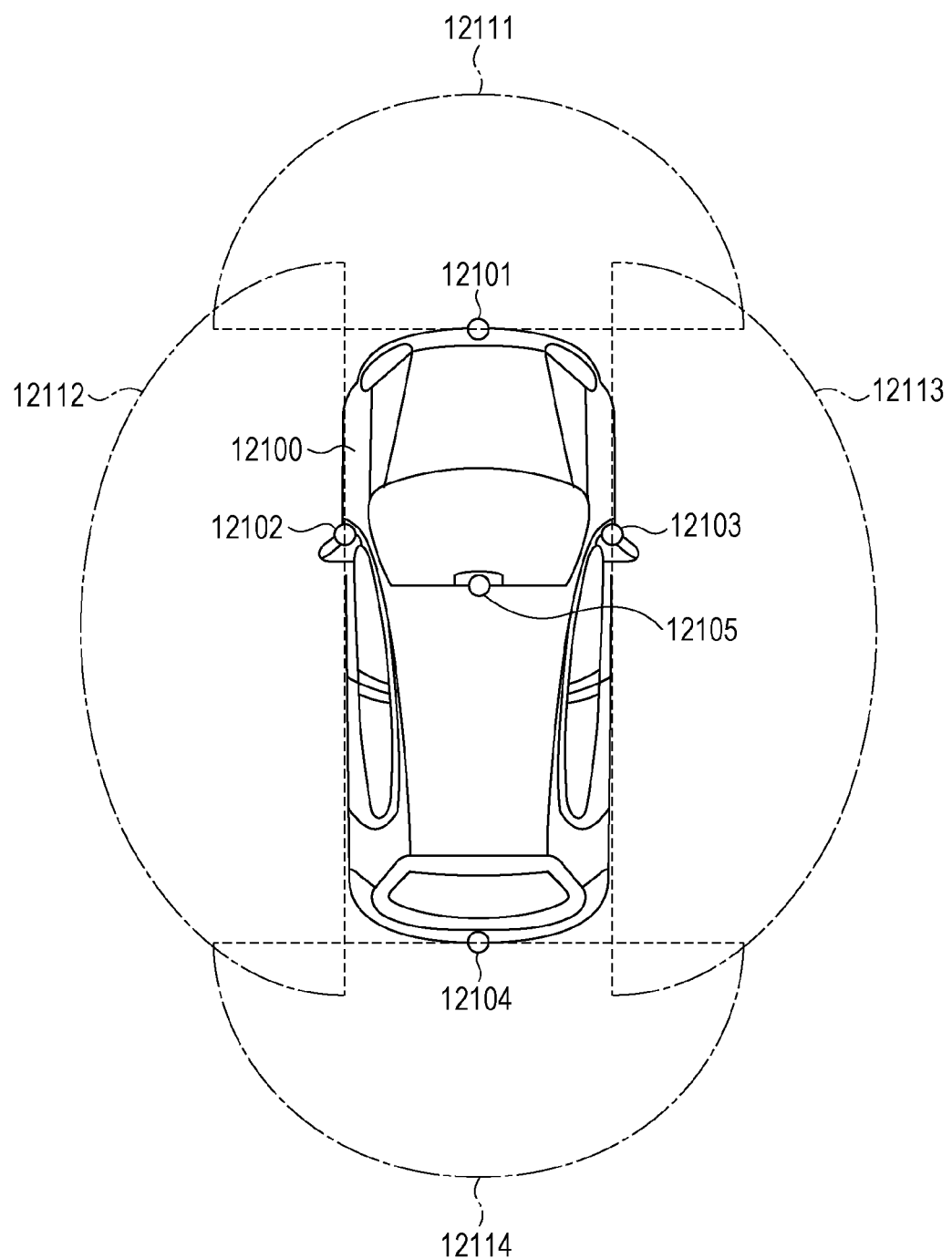
FIG. 25 is an explanatory diagram illustrating an example of an installation position of an imaging unit.

FIG. 25 is a diagram illustrating an example of an installation position of the imaging unit 12031.

In FIG. 25, imaging units 12101, 12102, 12103, 12104, and 12105 are included as the imaging unit 12031.

The imaging units 12101, 12102, 12103, 12104, and 12105 are provided at positions of a front nose, side mirrors, a rear bumper or a back door, an upper portion of a windshield, and the like in an interior of the vehicle 12100, for example. The imaging unit 12101 provided at the front nose and the imaging unit 12105 provided at an upper portion of the windshield in an interior of the vehicle mainly acquire images in front of the vehicle 12100. The imaging units 12102 and 12103 provided at the side mirrors mainly acquire images on sides of the vehicle 12100. The imaging unit 12104 provided at the rear bumper or the back door mainly acquires an image in back of the vehicle 12100. The imaging unit 12105 provided at the upper portion of the windshield in the interior of the vehicle is mainly used for detecting a preceding vehicle, a pedestrian, an obstacle, a traffic signal, a traffic sign, a lane, or the like.

Note that FIG. 25 illustrates an example of capture ranges of the imaging units 12101 to 12104. An imaging range 12111 indicates the imaging range of the imaging unit 12101 provided at the front nose, imaging ranges 12112 and 12113 respectively indicate the imaging ranges of the imaging units 12102 and 12103 provided at the side mirrors, and an imaging range 12114 indicates the imaging range of the imaging unit 12104 provided at the rear bumper or the back door. For example, a bird's-eye view image of the vehicle 12100 as viewed from above can be obtained by superimposing image data captured by the imaging units 12101 to 12104.

At least one of the imaging units 12101 to 12104 may have a function to acquire distance information. For example, at least one of the imaging units 12101 to 12104 may be a stereo camera including a plurality of imaging elements or may be an image sensor having pixels for phase difference detection.

For example, the microcomputer 12051 obtains distances to three-dimensional objects in the imaging ranges 12111 to 12114 and temporal change of the distances (relative speeds to the vehicle 12100) on the basis of the distance information obtained from the imaging units 12101 to 12104, thereby to extract particularly a three-dimensional object closest to the vehicle 12100 on a traveling road and traveling at a predetermined speed (for example, 0 km/h or more) in substantially the same direction as the vehicle 12100 as a leading vehicle. Moreover, the microcomputer 12051 can set an inter-vehicle distance to be secured from the leading vehicle in advance and perform automatic braking control (including following stop control) and automatic acceleration control (including following start control), and the like. In this way, the cooperative control for the purpose of automatic driving of autonomous travel without depending on an operation of the driver, and the like can be performed.

For example, the microcomputer 12051 classifies three-dimensional object data regarding three-dimensional objects into two-wheeled vehicles, ordinary cars, large vehicles, pedestrians, and other three-dimensional objects such as electric poles to be extracted, on the basis of the distance information obtained from the imaging units 12101 to 12104, and can use the data for automatic avoidance of obstacles. For example, the microcomputer 12051 discriminates obstacles around the vehicle 12100 into obstacles visually recognizable by the driver of the vehicle 12100 and obstacles visually unrecognizable by the driver. The microcomputer 12051 then determines a collision risk indicating a risk of collision with each of the obstacles, and can perform drive assist for collision avoidance by outputting warning to the driver through the audio speaker 12061 or the display unit 12062, and performing forced deceleration or avoidance steering through the drive system control unit 12010, in a case where the collision risk is a set value or more and there is a collision possibility.

At least one of the imaging units 12101 to 12104 may be an infrared camera that detects infrared light. For example, the microcomputer 12051 determines whether or not a pedestrian exists in the captured images of the imaging units 12101 to 12104, thereby to recognize the pedestrian. Such recognition of a pedestrian is performed by a process of extracting characteristic points in the captured images of the imaging units 12101 to 12104, as the infrared camera, for example, and by a process of performing pattern matching processing for the series of characteristic points indicating a contour of an object and determining whether or not the object is a pedestrian. When the microcomputer 12051 determines that a pedestrian exists in the captured images of the imaging units 12101 to 12104 and recognizes the pedestrian, the sound image output unit 12052 causes the display unit 12062 to superimpose and display a square contour line for emphasis on the recognized pedestrian. Furthermore, the sound image output unit 12052 may cause the display unit 12062 to display an icon or the like representing the pedestrian at a desired position.

An example of a vehicle control system to which the technology according to the present disclosure is applicable has been described. The technology according to the present disclosure is applicable to the imaging unit 12031, of the above-described configurations, for example. Specifically, the imaging device 100 in FIG. 1 can be applied to the imaging unit 12031. By applying the technology according to the present disclosure to the imaging unit 12031, power consumption of the imaging unit 12031 can be reduced. Therefore, power consumption of the vehicle control system as a whole can be reduced.

Note that the above-described embodiments describe an example for embodying the present technology, and the matters in the embodiments and the matters used to specify the invention in the claims have correspondence, respectively. Similarly, the matters used to specify the invention in the claims and the matters in the embodiment of the present technology given the same names have correspondence, respectively. However, the present technology is not limited to the embodiments, and can be embodied by application of various modifications to the embodiments without departing from the gist of the present technology.

Furthermore, the processing procedures described in the above embodiments may be regarded as a method having these series of procedures, and also regarded as a program for causing a computer to execute these series of procedures and as a recording medium for storing the program. As this recording medium, for example, a compact disc (CD), a mini disc (MD), a digital versatile disc (DVD), a memory card, a Blu-ray (registered trademark) disc, or the like can be used.

Note that the effects described in the present specification are merely examples and are not limited, and other effects may be exhibited.

Note that the present technology can also have the following configurations.

(1) A solid-state image sensor including:
a plurality of pixels each configured to generate an analog signal by photoelectric conversion; and
an analog-digital conversion unit configured to convert the analog signal of a pixel into a digital signal, the pixel having an amount of change in incident light amount that falls outside a predetermined range, of the plurality of pixels.

(2) The solid-state image sensor according to (1), in which
the analog-digital conversion unit includes
a selection unit that selects the analog signal of the pixel having the amount of change that falls outside the predetermined range from among the analog signals of the plurality of pixels, and
an analog-digital converter that converts the selected analog signal into the digital signal.

(3) The solid-state image sensor according to (1), in which
the plurality of pixel is provided in a predetermined number of columns arrayed in a predetermined direction,
the analog-digital conversion unit includes a fixed number of analog-digital converters for each of the columns, and
in a case where the amount of change of a pixel belonging to the corresponding column, of the plurality of pixels, falls outside the predetermined range, the analog-digital converter converts the analog signal of the pixel into the digital signal.

(4) The solid-state image sensor according to (1), in which
the plurality of pixels is provided in a predetermined number of columns arrayed in a predetermined direction, and
the analog-digital conversion unit includes
a first analog-digital conversion unit connected to part of the predetermined number of columns, and
a second analog-digital conversion unit connected to rest of the predetermined number of columns.
(5) The solid-state image sensor according to (4), in which
each of the first and second analog-digital conversion units includes
a selection unit that selects the analog signal of a column having the amount of change that falls outside the predetermined range from among the analog signals of the corresponding columns, and
an analog-digital converter that converts the selected analog signal into the digital signal.
(6) The solid-state image sensor according to (4), in which
each of the first and second analog-digital conversion units includes a fixed number of analog-digital converters for the each corresponding columns, and
in a case where the amount of change of a pixel belonging to the corresponding column, of the plurality of pixels, falls outside the predetermined range, the analog-digital converter converts the analog signal of the pixel into the digital signal.
(7) The solid-state image sensor according to any one of (1) to (6), in which
each of the plurality of pixels includes
a pixel signal generation unit that generates the analog signal, and
a detection unit that detects whether or not an absolute value of the amount of change exceeds a predetermined threshold, and generates a predetermined enable signal on the basis of a detection result, and
the analog-digital conversion unit converts the analog signal into the digital signal according to the enable signal.
(8) The solid-state image sensor according to any one of (1) to (6), further including:
a row arbiter configured to arbitrate first requests from a predetermined number of respective rows arrayed in a direction perpendicular to a predetermined direction, in which
the plurality of pixels is arrayed in the predetermined number of rows, and
each of the plurality of pixels transmits the first request in a case where the amount of change falls outside the predetermined range.
(9) The solid-state image sensor according to (8), further including:
a column arbiter configured to arbitrate second requests from a predetermined number of respective columns arrayed in the predetermined direction, in which
each of the plurality of pixels transmits the second request on the basis of an arbitration result of the row arbiter.
(10) The solid-state image sensor according to (9), in which
the column arbiter generates a predetermined enable signal on the basis of the second request, and
the analog-digital conversion unit converts the analog signal into the digital signal according to the enable signal.
(11) An imaging device including:
a plurality of pixels each configured to generate an analog signal by photoelectric conversion;
an analog-digital conversion unit configured to convert the analog signal of a pixel into a digital signal, the pixel having an absolute value of an incident light amount that falls outside a predetermined range, of the plurality of pixels; and
a signal processing unit configured to process the digital signal.

REFERENCE SIGNS LIST

100 Imaging device
110 Imaging lens
120 Recording unit
130 Control unit
200 Solid-state image sensor
201 Light-receiving chip
202 Detection chip
211 Drive circuit
212 Signal processing unit
213 Y arbiter
214 Upper-side signal processing unit
215 Lower-side signal processing unit
216 X arbiter
220 Column ADC
221 Upper-side column ADC
222 Lower-side column ADC
230 AD conversion unit
231 Multiplexer
232 ADC
233 Comparator
234 Counter
240 Control circuit
241 and 452 OR (logical sum) gate
242 Level shifter
243, 451, and 453 AND (logical product) gate
244 Demultiplexer
245 Switching control unit
300 Pixel array unit
310 Pixel
320 Pixel signal generation unit
321 Reset transistor
322 Amplification transistor
323 Selection transistor
324 Floating diffusion layer
330 Light-receiving unit
331 Transfer transistor
332 OFG transistor
333 Photoelectric conversion element
400 Address event detection unit
410 Current-voltage conversion unit
411 and 413 N-type transistor
412 P-type transistor
420 Buffer
430 Subtractor
431 and 433 Capacitor
432 Inverter
434 Switch
440 Quantizer
441 and 442 Comparator
450 Transfer unit
454 and 455 Flip-flop
12031 Imaging unit

The invention claimed is:
1. A solid-state image sensor comprising:
a plurality of pixels each configured to generate an analog signal by photoelectric conversion;
an analog-digital conversion unit configured to convert the analog signal into a digital signal for at least one of the pixels having an amount of change in an incident light amount that falls outside a predetermined range; and a row arbiter configured to arbitrate first requests from a predetermined number of respective rows arrayed in a direction perpendicular to a predetermined direction, wherein the plurality of pixels is arrayed in the predetermined number of rows, and each of the plurality of pixels is configured to transmit one of the first requests in a case where the amount of change falls outside the predetermined range.

2. The solid-state image sensor according to claim 1, wherein the analog-digital conversion unit includes selection circuitry configured to select the analog signal of the pixel having the amount of change that falls outside the predetermined range from among the analog signals of the plurality of pixels, and an analog-digital converter that converts the selected analog signal into the digital signal.

3. The solid-state image sensor according to claim 1, wherein the plurality of pixels is provided in a predetermined number of columns arrayed in a predetermined direction, the analog-digital conversion unit includes a fixed number of analog-digital converters for each of the columns, and in a case where the amount of change of at least one of the pixels belonging to the corresponding column falls outside the predetermined range, the corresponding analog-digital converter converts the analog signal of the pixel into the digital signal.

4. The solid-state image sensor according to claim 1, wherein the plurality of pixels is provided in a predetermined number of columns arrayed in a predetermined direction, and the analog-digital conversion unit includes a first analog-digital conversion unit connected to part of the predetermined number of columns, and a second analog-digital conversion unit connected to rest of the predetermined number of columns.

5. The solid-state image sensor according to claim 4, wherein each of the first and second analog-digital conversion units includes selection circuitry configured to select the analog signal of a column having the amount of change that falls outside the predetermined range from among the analog signals of the corresponding columns, and an analog-digital converter that converts the selected analog signal into the digital signal.

6. The solid-state image sensor according to claim 4, wherein each of the first and second analog-digital conversion units includes a fixed number of analog-digital converters for the respective corresponding columns, and in a case where the amount of change of one of the pixels belonging to one of the respective corresponding columns falls outside the predetermined range, the analog-digital converter converts the analog signal of the pixel into the digital signal.

7. The solid-state image sensor according to claim 1, wherein each of the plurality of pixels includes pixel signal generation circuitry configured to generate the analog signal, and detection circuitry configured to detect whether or not an absolute value of the amount of change exceeds a predetermined threshold, and generates a predetermined enable signal on a basis of a detection result, and the analog-digital conversion unit converts the analog signal into the digital signal according to the enable signal.

8. The solid-state image sensor according to claim 1, further comprising:

a column arbiter configured to arbitrate second requests from a predetermined number of respective columns arrayed in the predetermined direction, wherein each of the plurality of pixels is configured to transmits one of the second requests on a basis of an arbitration result of the row arbiter.

9. The solid-state image sensor according to claim 8, wherein the column arbiter generates a predetermined enable signal on a basis of the one of the second requests, and the analog-digital conversion unit converts the analog signal into the digital signal according to the enable signal.

10. An imaging device comprising:

a plurality of pixels each configured to generate an analog signal by photoelectric conversion;

an analog-digital conversion unit configured to convert the analog signal of a pixel into a digital signal for at least one of the pixels having an absolute value of an incident light amount that falls outside a predetermined range; and signal processing or configured to process the digital signal;

a row arbiter configured to arbitrate first requests from a predetermined number of respective rows arrayed in a direction perpendicular to a predetermined direction, wherein the plurality of pixels is arrayed in the predetermined number of rows, and each of the plurality of pixels is configured to transmit one of the first requests in a case where the absolute value falls outside the predetermined range.

11. The imaging device according to claim 10, wherein the analog-digital conversion unit includes selection circuitry configured to select the analog signal of the pixel having the absolute value that falls outside the predetermined range from among the analog signals of the plurality of pixels, and an analog-digital converter that converts the selected analog signal into the digital signal.

12. The imaging device according to claim 10, wherein the plurality of pixels is provided in a predetermined number of columns arrayed in a predetermined direction, the analog-digital conversion unit includes a fixed number of analog-digital converters for each of the columns, and in a case where the absolute value of at least one of the pixels belonging to the corresponding column falls outside the predetermined range, the corresponding analog-digital converter converts the analog signal of the pixel into the digital signal.

13. The imaging device according to claim 10, wherein
the plurality of pixels is provided in a predetermined number of columns arrayed in a predetermined direction, and
the analog-digital conversion unit includes
a first analog-digital conversion unit connected to part of the predetermined number of columns, and
a second analog-digital conversion unit connected to rest of the predetermined number of columns.

14. The imaging device according to claim 13, wherein
each of the first and second analog-digital conversion units includes
selection circuitry configured to select the analog signal of a column having the absolute value that falls outside the predetermined range from among the analog signals of the corresponding columns, and
an analog-digital converter that converts the selected analog signal into the digital signal.

15. The imaging device according to claim 13, wherein
each of the first and second analog-digital conversion units includes a fixed number of analog-digital converters for the respective corresponding columns, and
in a case where the absolute value of one of the pixels belonging to one of the respective corresponding columns falls outside the predetermined range, the analog-digital converter converts the analog signal of the pixel into the digital signal.

16. The imaging device according to claim 10, wherein
each of the plurality of pixels includes
pixel signal generation circuitry configured to generate the analog signal, and
detection circuitry configured to detect whether or not an absolute value of the absolute value exceeds a predetermined threshold, and generates a predetermined enable signal on a basis of a detection result, and
the analog-digital conversion unit converts the analog signal into the digital signal according to the enable signal.

17. The imaging device according to claim 10, further comprising:
a column arbiter configured to arbitrate second requests from a predetermined number of respective columns arrayed in the predetermined direction, wherein
each of the plurality of pixels is configured to transmit one of the second requests on a basis of an arbitration result of the row arbiter.

18. The imaging device according to claim 17, wherein
the column arbiter generates a predetermined enable signal on a basis of the one of the second requests, and
the analog-digital conversion unit converts the analog signal into the digital signal according to the enable signal.

* * * * *